(12) United States Patent
Elmer

(10) Patent No.: US 12,067,375 B2
(45) Date of Patent: *Aug. 20, 2024

(54) SYSTOLIC ARRAY INCLUDING FUSED MULTIPLY ACCUMULATE WITH EFFICIENT PRENORMALIZATION AND EXTENDED DYNAMIC RANGE

(71) Applicant: Amazon Technologies, Inc., Seattle, WA (US)

(72) Inventor: Thomas Elmer, Austin, TX (US)

(73) Assignee: Amazon Technologies, Inc., Seattle, WA (US)

(*) Notice: Subject to any disclaimer, the term of this patent is extended or adjusted under 35 U.S.C. 154(b) by 41 days.

This patent is subject to a terminal disclaimer.

(21) Appl. No.: 17/932,537

(22) Filed: Sep. 15, 2022

(65) Prior Publication Data

US 2023/0010054 A1    Jan. 12, 2023

Related U.S. Application Data

(63) Continuation of application No. 16/698,809, filed on Nov. 27, 2019, now Pat. No. 11,467,806.

(51) Int. Cl.
*G06F 7/544* (2006.01)
*G06F 15/80* (2006.01)

(52) U.S. Cl.
CPC ........ *G06F 7/5443* (2013.01); *G06F 15/8046* (2013.01)

(58) Field of Classification Search
CPC .................. G06F 7/5443; G06F 15/8046
See application file for complete search history.

(56) References Cited

U.S. PATENT DOCUMENTS

| 4,937,774 A | 6/1990 | Malinowski |
| 5,138,695 A | 8/1992 | Means et al. |
| 5,151,953 A | 9/1992 | Landeta |

(Continued)

FOREIGN PATENT DOCUMENTS

| EP | 3396524 A1 | 10/2018 |
| WO | 94/10638 A1 | 5/1994 |

(Continued)

OTHER PUBLICATIONS

Arnould, E., et al., A Systolic Array Computer., 1985, IEEE., pp. 232-235. (Year: 1985).

(Continued)

*Primary Examiner* — Michael D. Yaary
(74) *Attorney, Agent, or Firm* — Knobbe, Martens, Olson & Bear, LLP

(57) ABSTRACT

Systems and methods are provided to perform multiply-accumulate operations of at least one normalized number in a systolic array. The systolic array can obtain a first input and detect that the first input is denormal. Based on determining the first input is denormal, the systolic array can generate a first normalized number by normalizing the first input. Processing elements of the systolic array can include a multiplier and an adder. The multiplier can multiply the first normalized number by a second normal or normalized number to generate a multiplier product and the adder can add an input partial sum to the multiplier product to generate an addition result.

20 Claims, 10 Drawing Sheets

(56) References Cited

U.S. PATENT DOCUMENTS

| | | | |
|---|---|---|---|
| 5,168,499 | A | 12/1992 | Peterson et al. |
| 5,659,781 | A | 8/1997 | Larson |
| 5,692,147 | A | 11/1997 | Larsen et al. |
| 5,764,556 | A | 6/1998 | Stiles |
| 6,205,462 | B1 | 3/2001 | Wyland et al. |
| 6,463,453 | B1 | 10/2002 | Dang |
| 6,480,872 | B1 | 11/2002 | Choquette |
| 6,801,924 | B1 | 10/2004 | Green et al. |
| 7,724,261 | B2 | 5/2010 | Thekkath et al. |
| 7,814,137 | B1 | 10/2010 | Mauer |
| 8,184,696 | B1 | 5/2012 | Chirila-Rus et al. |
| 8,610,729 | B2 | 12/2013 | Airey et al. |
| 8,924,455 | B1 | 12/2014 | Barman et al. |
| 9,552,189 | B1 | 1/2017 | Langhammer et al. |
| 10,790,830 | B1 | 9/2020 | Pugh et al. |
| 10,817,260 | B1 | 10/2020 | Huang et al. |
| 10,872,295 | B1 | 12/2020 | Liu et al. |
| 10,879,904 | B1 | 12/2020 | Gunter et al. |
| 10,915,297 | B1 | 2/2021 | Halutz et al. |
| 11,113,233 | B1 | 9/2021 | Volpe |
| 11,232,062 | B1 | 1/2022 | Volpe et al. |
| 11,308,026 | B1 | 4/2022 | Volpe et al. |
| 11,308,027 | B1 | 4/2022 | Volpe et al. |
| 11,422,773 | B1 | 8/2022 | Volpe et al. |
| 11,467,806 | B2 | 10/2022 | Elmer |
| 11,762,803 | B2 | 9/2023 | Volpe et al. |
| 11,816,446 | B2 | 11/2023 | Elmer et al. |
| 11,842,169 | B1 | 12/2023 | Elmer |
| 11,880,682 | B2 | 1/2024 | Myer et al. |
| 2003/0081489 | A1 | 5/2003 | Scheuerlein et al. |
| 2004/0139274 | A1 | 7/2004 | Hui |
| 2006/0149803 | A1 | 7/2006 | Siu et al. |
| 2007/0028076 | A1 | 2/2007 | Wezelenburg |
| 2007/0185953 | A1 | 8/2007 | Prokopenko et al. |
| 2009/0248769 | A1 | 10/2009 | Chua |
| 2011/0025900 | A1 | 2/2011 | Kondo |
| 2011/0058569 | A1 | 3/2011 | Harrand |
| 2011/0225116 | A1 | 9/2011 | Gupta et al. |
| 2016/0342890 | A1 | 11/2016 | Young |
| 2016/0342892 | A1 | 11/2016 | Ross |
| 2016/0358069 | A1 | 12/2016 | Brothers et al. |
| 2017/0010863 | A1 | 1/2017 | Nystad |
| 2017/0097824 | A1 | 4/2017 | Elmer et al. |
| 2017/0103311 | A1 | 4/2017 | Henry et al. |
| 2017/0115958 | A1 | 4/2017 | Langhammer |
| 2017/0235515 | A1 | 8/2017 | Lea et al. |
| 2018/0036165 | A1 | 2/2018 | Fallon |
| 2018/0052660 | A1 | 2/2018 | Lutz |
| 2018/0164866 | A1 | 6/2018 | Turakhia et al. |
| 2018/0218518 | A1 | 8/2018 | Yan et al. |
| 2018/0225116 | A1 | 8/2018 | Henry et al. |
| 2018/0314671 | A1 | 11/2018 | Zhang et al. |
| 2018/0315398 | A1 | 11/2018 | Kaul et al. |
| 2018/0336163 | A1 | 11/2018 | Phelps et al. |
| 2018/0336164 | A1 | 11/2018 | Phelps et al. |
| 2018/0336165 | A1 | 11/2018 | Phelps et al. |
| 2019/0026077 | A1 | 1/2019 | Manzo |
| 2019/0041961 | A1 | 2/2019 | Desai et al. |
| 2019/0079801 | A1 | 3/2019 | Lyuh et al. |
| 2019/0138882 | A1 | 5/2019 | Choi et al. |
| 2019/0236049 | A1 | 8/2019 | Vantrease et al. |
| 2019/0294413 | A1 | 9/2019 | Vantrease et al. |
| 2019/0311243 | A1 | 10/2019 | Whatmough et al. |
| 2019/0377549 | A1 | 12/2019 | Alben et al. |
| 2019/0385050 | A1 | 12/2019 | Wang et al. |
| 2020/0026497 | A1 | 1/2020 | Park et al. |
| 2020/0117988 | A1 | 4/2020 | Arthur et al. |
| 2020/0150958 | A1 | 5/2020 | Ahmed |
| 2020/0159809 | A1 | 5/2020 | Catthoor et al. |
| 2020/0192701 | A1 | 6/2020 | Horowitz et al. |
| 2020/0201576 | A1 | 6/2020 | Yudanov et al. |
| 2020/0226473 | A1 | 7/2020 | Sharma et al. |
| 2020/0285605 | A1 | 9/2020 | Nam |
| 2020/0302298 | A1 | 9/2020 | Van et al. |
| 2020/0349106 | A1 | 11/2020 | Ovsiannikov |
| 2021/0019591 | A1 | 1/2021 | Venkatesh et al. |
| 2021/0042087 | A1 | 2/2021 | Pugh et al. |
| 2021/0064985 | A1 | 3/2021 | Sun et al. |
| 2021/0072955 | A1 | 3/2021 | Mellempudi et al. |
| 2021/0089316 | A1 | 3/2021 | Rash et al. |
| 2021/0091794 | A1 | 3/2021 | Snelgrove et al. |
| 2021/0103429 | A1 | 4/2021 | Nair et al. |
| 2021/0150770 | A1* | 5/2021 | Appu .................. G06F 9/45533 |
| 2021/0157548 | A1 | 5/2021 | Elmer |
| 2021/0157549 | A1 | 5/2021 | Elmer et al. |
| 2022/0350567 | A1 | 11/2022 | Pan et al. |
| 2022/0350775 | A1 | 11/2022 | Volpe |
| 2023/0004384 | A1 | 1/2023 | Meyer et al. |
| 2023/0004523 | A1 | 1/2023 | Meyer et al. |

FOREIGN PATENT DOCUMENTS

| | | |
|---|---|---|
| WO | 2021/108644 A1 | 6/2021 |
| WO | 2021/108660 A1 | 6/2021 |
| WO | 2023/278475 A1 | 1/2023 |

OTHER PUBLICATIONS

Bao, Wenji, et al., A Reconfigurable Macro-Pipelined Systolic Accelerator Architecture, 2011, IEEE., 6 pages. (Year: 2011).

Dick, Chris., Computing the Discrete Fourier Transform on FPGA Based Systolic Arrays, 1996, Proc of the 4th Intl. ACM Symposium on Field Programmable Gate Arrays, 7 pages. (Year: 1996).

Garland et al. "Low Complexity Multiple Accumulate Units for Convolutional Neural Networks with Weight Sharing," ACM, 24 pages (2018).

Grout, "Chapter 5—Introduction to Digital Logic Design," Digital Systems Design with FPGAS and CPLDS, Ed. Burlington: Newnes, 2008, p. 217-331.

Henry, "Leveraging the bfloat16 Artificial Intelligence Datatype for Higher-Precision Computations," 2019 IEEE 26th Symposium on Computer Arithmetic, 2019, p. 69-76.

Hu, Hen Yu, et al., Systolic Arrays, 2018, SpringerLink, Handbook or Signal Processing Systems, pp. 939-977. (Year: 2018).

International Search Report and Written Opinion in PCT Application No. PCT/US2022/03535, mailed Oct. 14, 2022, 26 pages.

International Search Report and Written Opinion received for PCT Patent Application No. PCT/US2020/062337, mailed on Mar. 4, 2021, 8 pages.

International Search Report and Written Opinion received for PCT Patent Application No. PCT/US2020/062356, mailed on Mar. 4, 2021, 8 pages.

Kung "Why Systolic Architectures," IEEE pp. 37-48 (1982).

Kung et al. "Design Algorithms for VLSI Systems," Dept. of Computer Science, Carnegie Mellon Univ, Pittsburgh (Jan. 1979).

Kung et al. "Packing Sparse Convolutional Neural Networks for Efficient Systolic Array Implementations: Column Combining under Joint Optimization," ACM. pp. 821-834 (2019).

Kung et al. "Systolic Arrays for VLSI," Dept. of Computer Science, Carnegie Mellon, Pittsburgh (Apr. 1978).

Liu, B. et al., An Energy-Efficient Systolic Pipeline Architecture for Binary Conbolutional Neural Network, 2019, IEEE, 4 pages. (Year: 2019).

Pedram, A. et al. A High performance, Low Power Linear Algebra Core, 2011, IEEE, pp. 35-42 (Year 2011).

Tannenbaum, Structured Computer Organization, 2nd Edition, 1984, Prentice-Hall, Inc., p. 1-5.

Wah, B, W. et al. Systolic Programming for Dynamic Programming Problems, 1999, Circuits Systems Signal Processing vol. 7, No. 2, pp. 119-149. (Year:1999).

Yang, Z. et al., "Systolic Array Based Accelerator and Algorithm Mapping for Deep Learning Algorithms", Network and Parallel Computing, 2018, pp. 153-158.

Hu, Hen Yu., et al. Systolic Arrays, 2019, Spring intl. Publishing, pp. 939-977. (Year: 2019).

G. Henry, P. T. P. Tang and A. Heinecke, "Leveraging the bfloat16 Artificial Intelligence Datatype for Higher-Precision Computa-

(56) References Cited

OTHER PUBLICATIONS tions," 2019 IEEE 26th Symposium on Computer Arithmetic (ARITH), Kyoto, Japan, 2019, pp. 69-76. (Year: 2019).

* cited by examiner

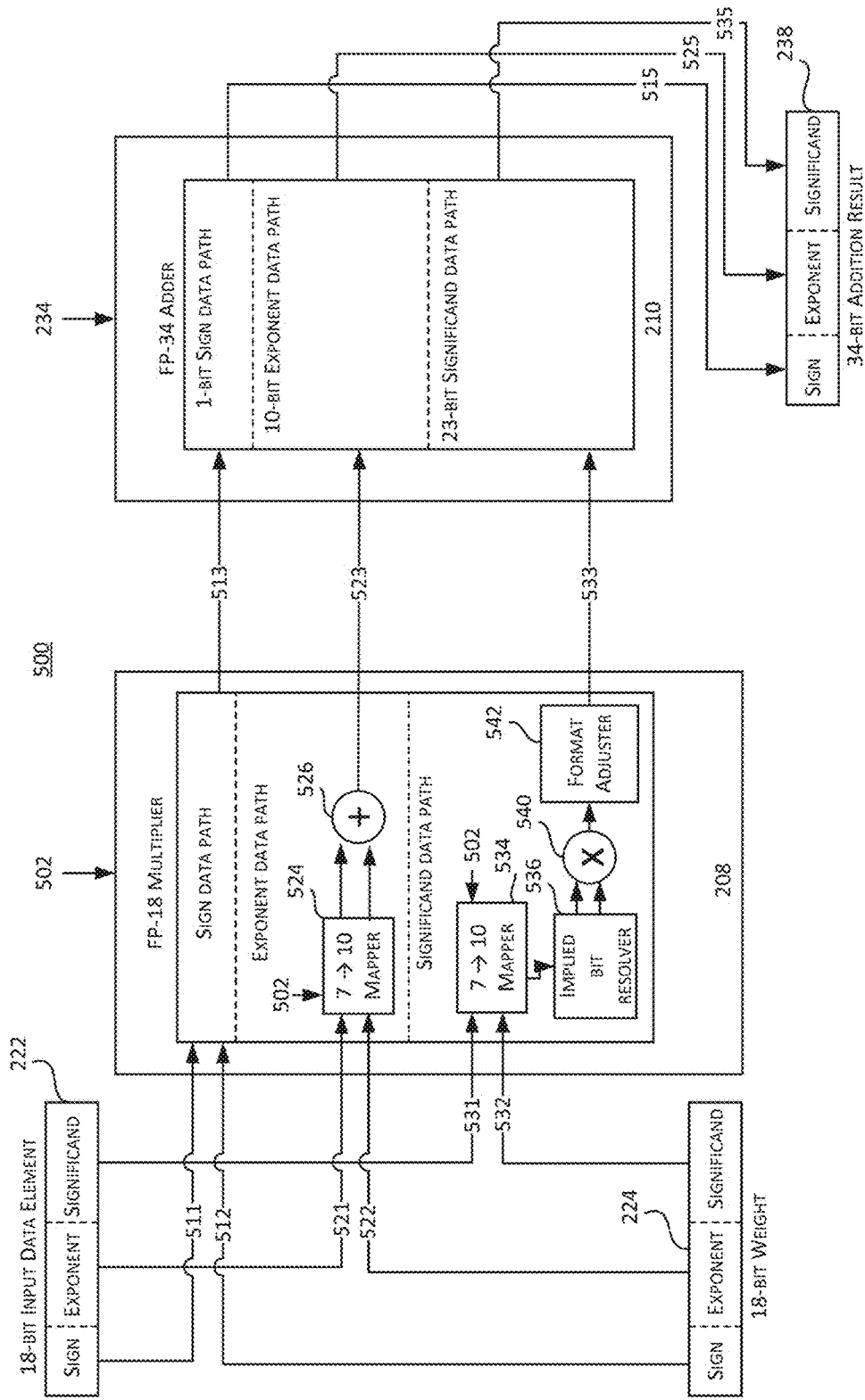

US 12,067,375 B2

SYSTOLIC ARRAY INCLUDING FUSED MULTIPLY ACCUMULATE WITH EFFICIENT PRENORMALIZATION AND EXTENDED DYNAMIC RANGE

CROSS-REFERENCE TO RELATED APPLICATIONS

This application is a continuation of U.S. patent application Ser. No. 16/698,809, filed on Nov. 27, 2019, entitled "SYSTOLIC ARRAY INCLUDING FUSED MULTIPLY ACCUMULATE WITH EFFICIENT PRENORMALIZATION AND EXTENDED DYNAMIC RANGE," the disclosure of which is hereby incorporated by reference in its entirety. Furthermore, any and all priority claims identified in the Application Data Sheet, or any connection thereto, are hereby incorporated by reference under 37 C.F.R. § 1.57.

BACKGROUND

Artificial neural networks are computing systems with an architecture based on biological neural networks. A neural network may be implemented by circuitries and data paths, such as a systolic array. Systolic arrays can accelerate the performance of the training and inference phases of artificial neural networks. During the training phase, input data can be provided to train a model. During the inference phase, new inputs can be processed according to the model to obtain a predicted result. User applications often use the model in the inference phase, so the inference phase can often have time sensitivities, and latency during the inference phase can negatively impact the user experience.

As more applications use artificial neural networks, the applications also use a wide range of numbers that can cause numerical underflow, for example, with floating point arithmetic calculations. While computational support for denormal numbers can help to accommodate numerical underflow, providing support for denormal numbers can result in increases to the complexity, size and cost of the processing elements in the systolic array. These increases can also affect the system processing speed and the system power consumption. Power consumption and the size of the systolic array can become highly important when a systolic array is required to support both normal and denormal numbers.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 5 illustrates a multiply accumulate datapath for neural network computations, according to certain examples of the disclosed technologies.

DETAILED DESCRIPTION

Figure 1:
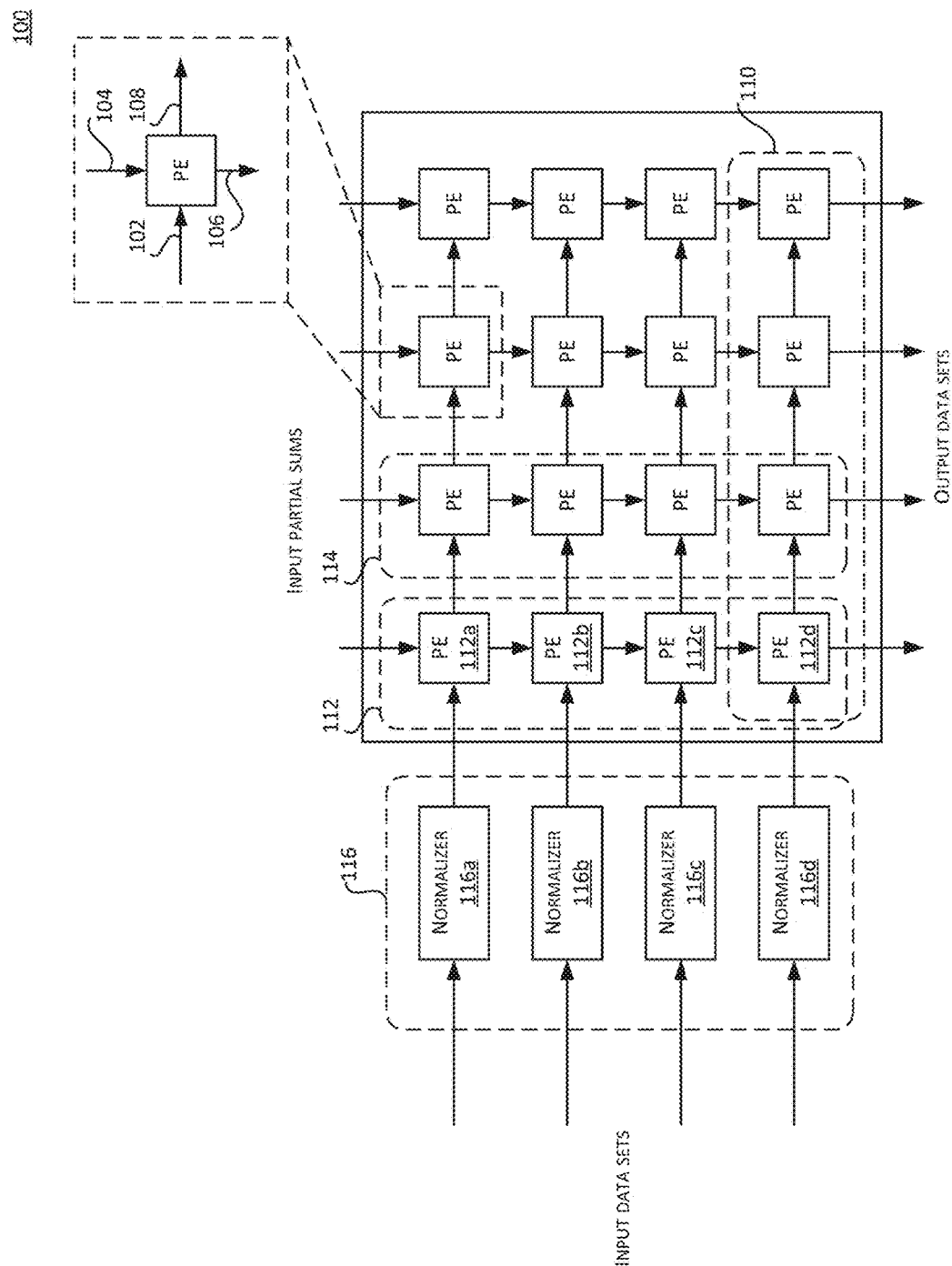
FIG. 1 illustrates an example 4×4 systolic array and an example column of normalizers.

In the following description, various examples will be described. For purposes of explanation, specific configurations and details are set forth in order to provide a thorough understanding of the examples. However, it will also be apparent to one skilled in the art that the embodiments may be practiced without the specific details. Furthermore, well-known features may be omitted or simplified in order not to obscure the embodiments being described.

A convolutional neural network (CNN) is generally a feed-forward artificial neural network, which may include multiple intermediate layers and an output from one layer may be used as an input to the next layer. Systolic arrays may be used to accelerate the workload in neural networks by reading the data from the memory once, and reusing it in multiple computations. A systolic array may be implemented using a two-dimensional array of processing elements (PEs).

The PEs may be divided into rows and columns. Each PE of the input layer may receive an element of an input data set, and scale the element with a weight (or a filter) to indicate the element's degree of influence on the output. The PEs in the intermediate layers may combine the scaled elements received from each PE of the input layer to compute a set of intermediate outputs. For example, each PE in the intermediate layers may compute a sum of the element-weight products, and then generate an intermediate output by applying an activation function to the sum. The intermediate outputs from each PE of one intermediate layer may be considered as an activated vote (or no-vote), associated with a weight indicating the vote's influence, to determine the intermediate output of the next intermediate layer. The output layer may generate a sum of the scaled intermediate outputs from the final intermediate layer, and generate a binary output (e.g., "yes" or "no") based on whether the sum of the scaled intermediate outputs exceeds a threshold.

Generally, an input data set (e.g., an input feature map) may be fed, one input data element at a time, into its respective row of the systolic array, and passed from one PE to another PE in a given row starting from a leftmost PE. As machine learning applications and neural network applications proliferate, the variety of values and data types for the input data set similarly proliferate. Some applications use higher precision floating-point 32-bit (FP32) or floating-point 64-bit (FP64) data type inputs. Some applications require higher precision calculations but use floating-point 16-bit (FP16), brain float point 16 bit (bfloat16 or BF16), or 16-bit integer, or 8-bit integer data type inputs. These higher precision calculations can cause underflow where the data type, FP16 for example, is no longer capable of representing a calculated value due to the range and precision restrictions of that data type. Some applications or systems therefore allow the use of denormal numbers to maximize the representable range and precision of numeric data. Denormal numbers (which are sometimes referred to as "subnormal" numbers) differ from normal numbers in that an implied bit, recognized as the most significant bit of the significand, is no longer set to a high value or one value. Also, the exponent field of a denormal number can be set to all zeros.

Providing support for both denormal and normal numbers results in significant increases in integrated circuit die cost, power consumption, circuit complexity, and latency in comparison to supporting only normal numbers. In a systolic array of hundreds or thousands of PEs, the added support for denormal numbers can cause an exponential increase in the integrated circuit die cost, power consumption, circuit complexity, and latency.

In some configurations, a PE supports performing mathematical operations on normalized numbers without additional circuitry that would support accurate denormal computations. For example, for an FP16 systolic array to support computations on both denormal and normal numbers, each processing element in the systolic array may require modifications to support or perform mathematical operations on denormal inputs and/or generate denormal outputs from those operations. Such modifications may be particularly undesirable, and may preclude providing arithmetic support for denormal numeric values.

Embodiments of the disclosed technologies can provide systems and methods to reduce dynamic power consumption in a systolic array and reduce both the size and quantity of circuitry required to complete an operation that could involve both normal and denormal numbers. Additionally, embodiments of the disclosed technologies can provide systems and methods to enable a systolic array to accept both normal and denormal data, reducing the need for specialized circuitry for each data type. In one embodiment, these problems are solved by providing a systolic array with a column of normalizers that provides normalized inputs to the systolic array. In some embodiments, each normalizer may be configured to provide more than one normalized input to the systolic array.

As disclosed herein, each normalizer to a systolic array may normalize one or more inputs provided to the normalizer and output one or more normalized inputs based at least in part on the one or more inputs. The one or more normalized inputs may be represented in a modified format with a normalized significand. The normalized input may have a sign bit, non-zero exponent bits, and significand bits with a non-zero bit as the most significant bit. The most significant bit of the significant bits may be implied or hidden. Each normalizer may include one or more of the following: a denormal detector, an exponent expander, a leading zero encoder, a shifter, a subtractor, and a multiplexer. Each normalizer may contain any combination of these components. The normalizer may be provided an input and normalize that input based upon the operators provided to that normalizer. Each normalizer may provide a normalized input to the systolic array.

In some implementations, the normalizers may contain a multiplexer that selects among two or more inputs based on a control signal, such as an opcode or a data type indicator. The output of the multiplexer may be provided to a second portion of the normalizer to be normalized.

In some implementations, a systolic array can have separate normalizers that receive one of either the input data element or the weight and provide the corresponding normalized version of that input to the systolic array. Each processing element in the initial row of processing elements of the systolic arrays may be configured to receive a normalized input data element from a first normalizer and a normalized weight from a second normalizer. For example, a first normalizer may receive an input data element and provide a normalized input data element to a first processing element, and a second normalizer may receive a weight and provide a normalized weight to the first processing element.

The systolic array may be configured to provide an initial column of zero input data detectors and zero weight detectors. Each zero input data detector and each zero weight detector may be configured to detect when an input to the processing element is zero or null. Each zero input data detector and each zero weight detector may be provided with normalized versions of each input to the processing element. For example, each zero input data detector may be provided with a normalized input data element and each zero weight detector may be provided with a normalized weight. Each zero input data detector may then be configured to provide the systolic array with each normalized input data element and each zero weight detector may then be configured to provide the systolic array with each normalized weight. In some implementations, each zero weight detector and each zero input data detector may be configured to provide a zero or null input to the systolic array if the normalized input data element or normalized weight are zero. In other implementations, the zero input data detector and/or the zero weight detector may precede the respective normalizer in series. In other implementations the zero input data detector and/or the zero weight detector be configured to process an input or weight in parallel with a respective normalizer.

Each normalizer may be configured to normalize numbers of 16-bits, 32-bits, or any number of bits. Further, each normalizer may be configured to normalize both floating-point and brain floating-point numbers. For example, a normalizer may be provided a BF16 number with a 1-bit sign, an 8-bit exponent, and a 7-bit significand to normalize into an 18-bit format with a 1-bit sign, a 10-bit expanded exponent, and a 7-bit shifted significand. Further, a normalizer may be provided a FP16 number with a 1-bit sign, a 5-bit exponent, and a 10-bit significand to normalize into an 18-bit format with a 1-bit sign, a 7-bit expanded exponent, and a 10-bit shifted significand. In other implementations, the normalizers can be configured to normalize numbers of a plurality of different data formats into a single, longer data format having a sufficient number of bits to represent the longest significand and a sufficient number of exponents to represent the largest exponent after shifting the significand into a normalized format.

The systolic array may have PEs that include an 18-bit multiplier and a 34-bit adder. The 18-bit multiplier may be configured to operate on 18-bit normalized, floating-point numbers that were normalized from the FP16 or BF16 formats. The multiplier may be configured to generate a multiplier product with a sign bit, ten exponent bits, and 23 significand bits. The multiplier product may include 24 significand bits where the most significant bit is implied or hidden. The 34-bit adder may be configured to operate on 34 bit numbers. The 34-bit adder may be configured to operate on 35-bit numbers where one bit is implied or hidden. In some implementations, the systolic array may be configured to include an 18-bit multiplier and a 32-bit adder, wherein the 18-bit multiplier and the 32-bit adder may be configured to operate on 18-bit normalized floating-point numbers. In some implementations, the systolic array may be configured to include an n-bit multiplier and an m-bit adder wherein n may be any number and the n-bit multiplier and m-bit adder may be configured to operate on x-bit normalized floating-point numbers and y-bit normalized brain floating-point numbers. The variables n, m, x, and y may be any number where n is greater than the larger of x and y.

The systolic array may include multiple delay registers in the PEs. Each of these delay registers may receive an input and delay outputting the input for at least one clock cycle. For example, a delay register may be placed between a multiplier and an adder. The multiplier may be configured to produce one or more multiplier products and send the one or more multiplier products to the delay register. The delay register may be configured to delay at least one clock cycle before providing the one or more multiplier products to the adder.

The systolic array may be capable of skipping multiplication operations in a PE under certain conditions. The multiplication operation can be skipped when a zero is detected on an input data element for a current operation or a no-operation (NOP) is received by a PE. For example, each PE may receive an opcode indicating an operation to be executed by the PE. The PE may decode the opcode to determine if the opcode value corresponds to a NOP. An example systolic array is explained with reference to FIG. 1.

FIG. 1 illustrates an example 4×4 systolic array 100. For example, the systolic array 100 may include four PEs in each row, and four PEs in each column. It will be understood that the systolic array 100 may include any number of PEs in each row and column. It will be further understood that the systolic array 100 may be logically organized in any number of rows and any number of columns. The systolic array 100 may be part of a neural network processor in a computer system. For example, the computer system may be configured to provide multi-tenant compute services for data processing applications such as an image recognition service, text-based data processing (e.g., processing of search queries), audio or video data processing, etc.

Each PE may include a row input bus 102, a column input bus 104, a column output bus 106, and a row output bus 108. A PE may receive inputs from a left PE of the same row (or from external circuitries) via the row input bus 102. The PE may also receive inputs from a PE of the same column above (or from external circuitries) via the column input bus 104. The PE may perform arithmetic computations based on the inputs, and transmit the result of the arithmetic computations to a PE of the same column below (or to the external circuitries) via the column output bus 106. The PE may also forward the inputs received via the row input bus 102 to a right PE of the same row via the row output bus 108.

The systolic array 100 may perform arithmetic computations, including multiplication and addition operations, for the processing elements of a neural network. For example, each PE may include arithmetic units such as a multiplier and an adder, or a fused multiplier adder. In the example of FIG. 1, each row of the PEs may be configured to handle one set of input data, and each column of the PEs may generate one set of output data based on the sets of input data received by each PE in a given column.

A column 112 of the PEs (the leftmost column) may receive four sets of input data, with each set of input data being handled by one row of the PEs. A column 116 of normalizers may provide four sets of normalized input data to the column 112 of the PEs, with each set of input data being provided by one normalizer. Each normalizer in the column 116 of normalizers may provide a set of normalized input data, wherein each set of normalized input data includes two or more normalized inputs. For example, the normalizer 116a may provide a normalized input data element and a normalized weight to the PE 112a. Each normalizer in the column 116 of normalizers may convert the inputs into normalized inputs. For example, the normalizer 116a may convert a 16-bit input data element into a normalized 18-bit input data element.

Each normalizer in the column 116 of normalizers may further select a normalized input to provide to each PE in the column 112 of the PEs. For example, each normalizer in the column 116 of normalizers may contain a multiplexer to select a weight or an input data element. In some embodiments, each normalizer 116a-116d may be implemented as a first normalizer and a second normalizer. The first normalizer and second normalizer may provide one or more inputs to the column 112 of the PEs. For example, a first normalizer of the normalizer 116a may be configured to provide a normalized input data element to the PE 112a and a second normalizer of a normalizer 116a may be configured to provide a normalized weight to the PE 112a.

Each PE in the column 112 may obtain, from the corresponding input data set received via the row input bus 102, the normalized input data element and the normalized weight. Each PE in the column 112 may multiply the normalized input data element with the normalized weight to generate a scaled input. The scaled inputs generated by the PEs within any column (including the column 112) can be accumulated by the adder of each PE. For example, a PE 112a (of the column 112) may generate a first scaled input (from the first input data set), wherein the first scaled input may be based on the outputs of the adder. For example, the adder may generate a first output partial sum and the PE 112a may be configured to generate a first scaled input based at least in part on the first output partial sum. The PE 112a may be configured to transmit the first scaled input to a PE 112b via the column output bus 106 as a partial sum. The PE 112b may also generate a second scaled input (from the second input data set) and add the second scaled input to the partial sum. The updated partial sum, accumulated with the first scaled input and the second scaled input, is then transmitted to a PE 112c via the column output bus 106. The partial sums are updated and propagated across the column 112, and a PE 112d may generate a sum of the scaled inputs from the four input data sets.

The sum generated by the PE 112d may correspond to an output data set, and may be fed back to the leftmost PEs after going through an activation function. Moreover, each PE in the column 112 can also propagate the input data sets to other PE columns (e.g., a column 114), which can scale the input data sets with a different set of weights from the column 112. Each column of the PEs can perform the arithmetic operations (multiplications and additions) to generate the output data elements for other processing elements in parallel. In the example of FIG. 1, the systolic array 100 can generate output data elements for four PEs corresponding to the four columns of the systolic array 100.

The systolic array 100 may perform convolution computations in multiple waves. In one embodiment, a wave represents a stream of input data elements processed while reusing the same weights in the systolic array 100. For example, the respective weights may have been pre-loaded in each PE in the systolic array 100, sequentially or in parallel prior to starting a wave computation. The partial sums generated by the PEs may correspond to a single wave. As the PEs of the systolic array 100 perform arithmetic operations for the convolution computations, dynamic power dissipated by all the multipliers in the PEs may be significant. This problem may be further exacerbated for a systolic array comprising a large number of PEs (e.g., several thousands). The arithmetic operations performed by a PE are further explained with reference to FIG. 2A and FIG. 2B.

Figure 2A:
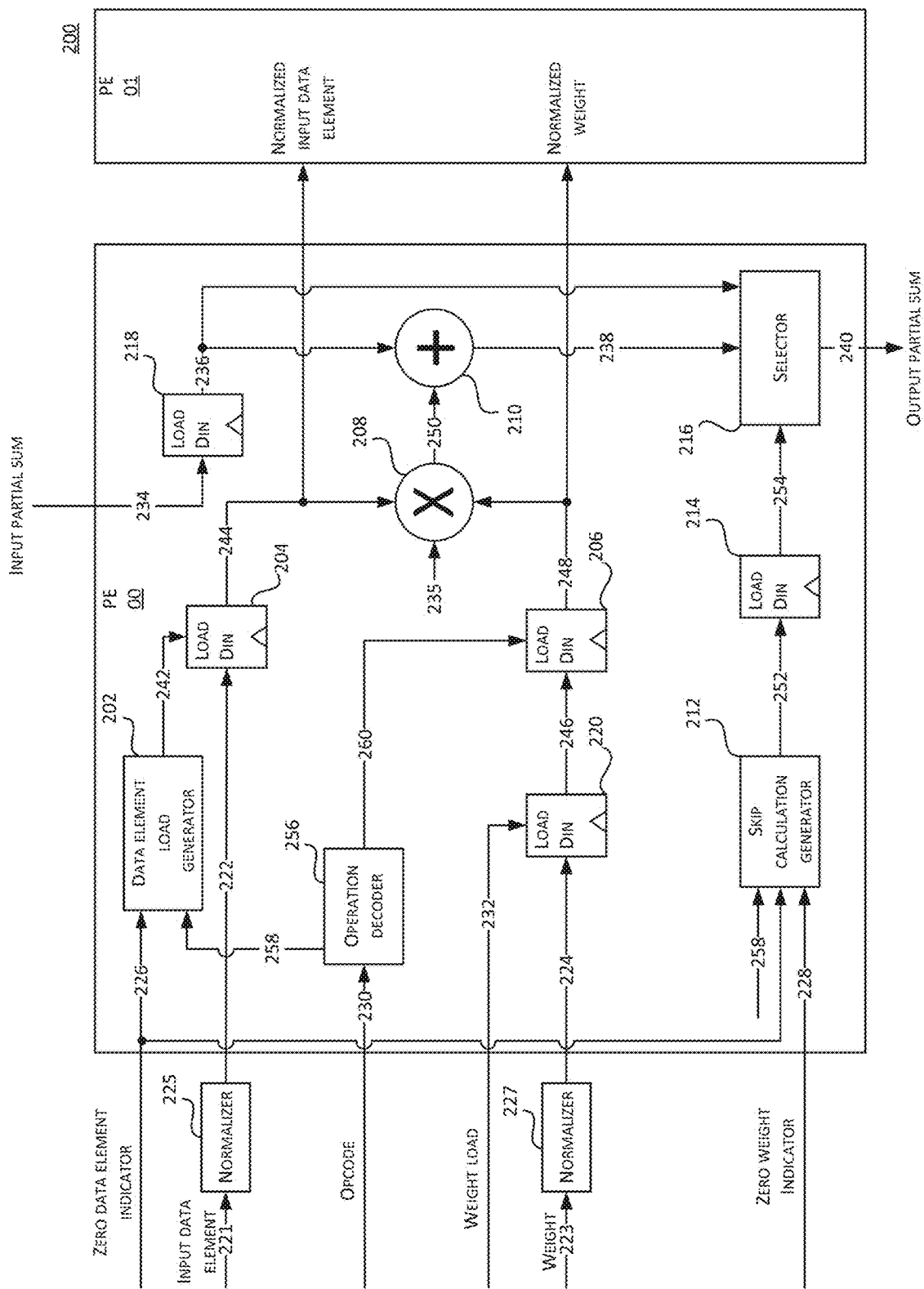
FIG. 2A illustrates a processing element for neural network computations with the inputs entering through separate normalizers, according to certain examples of the disclosed technologies.
Figure 4A:
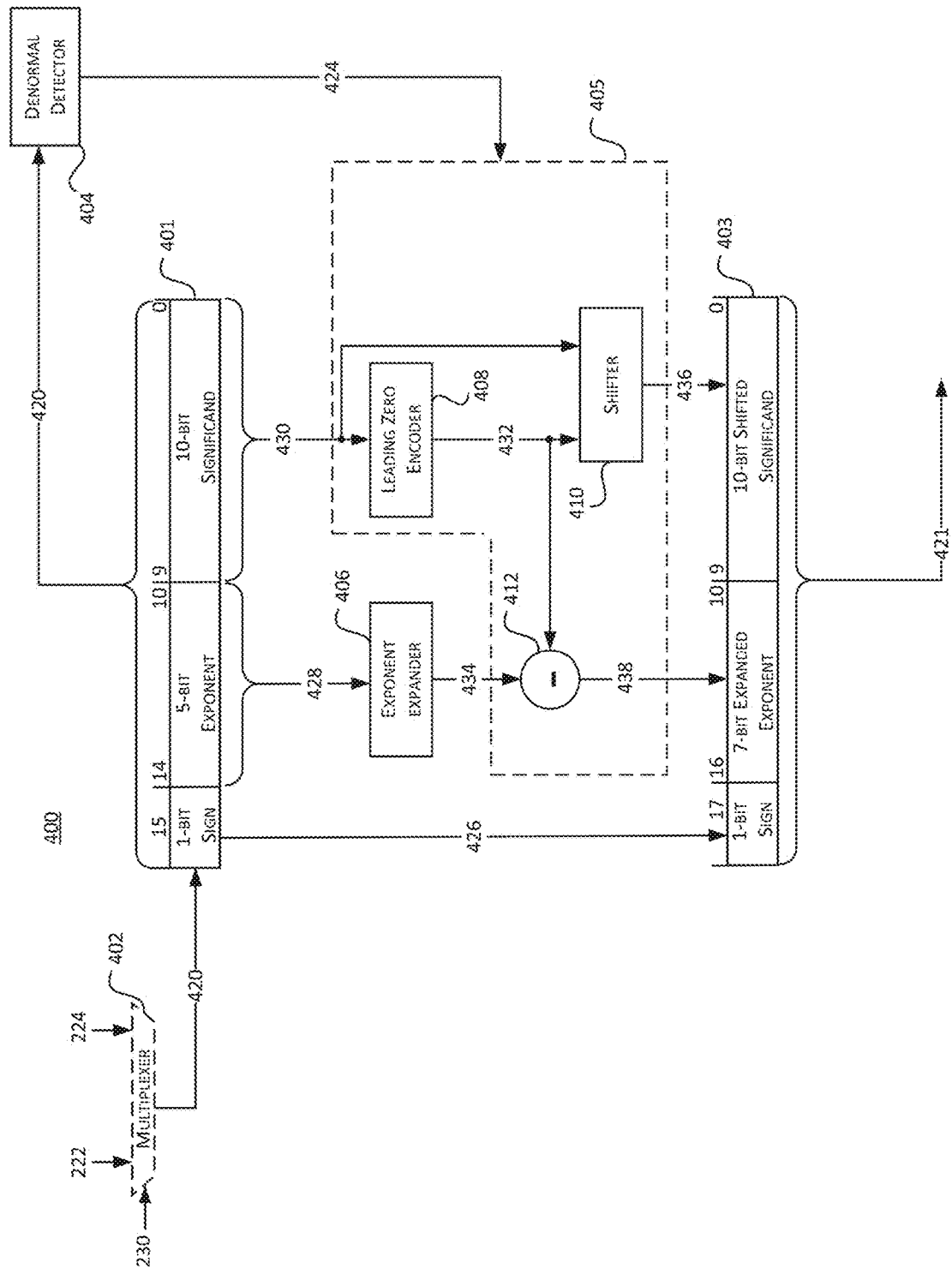
FIG. 4A illustrates a normalizer showing the selection of an input to be normalized where the input is a floating-point 16-bit number, according to some examples of the disclosed technologies.
Figure 4B:
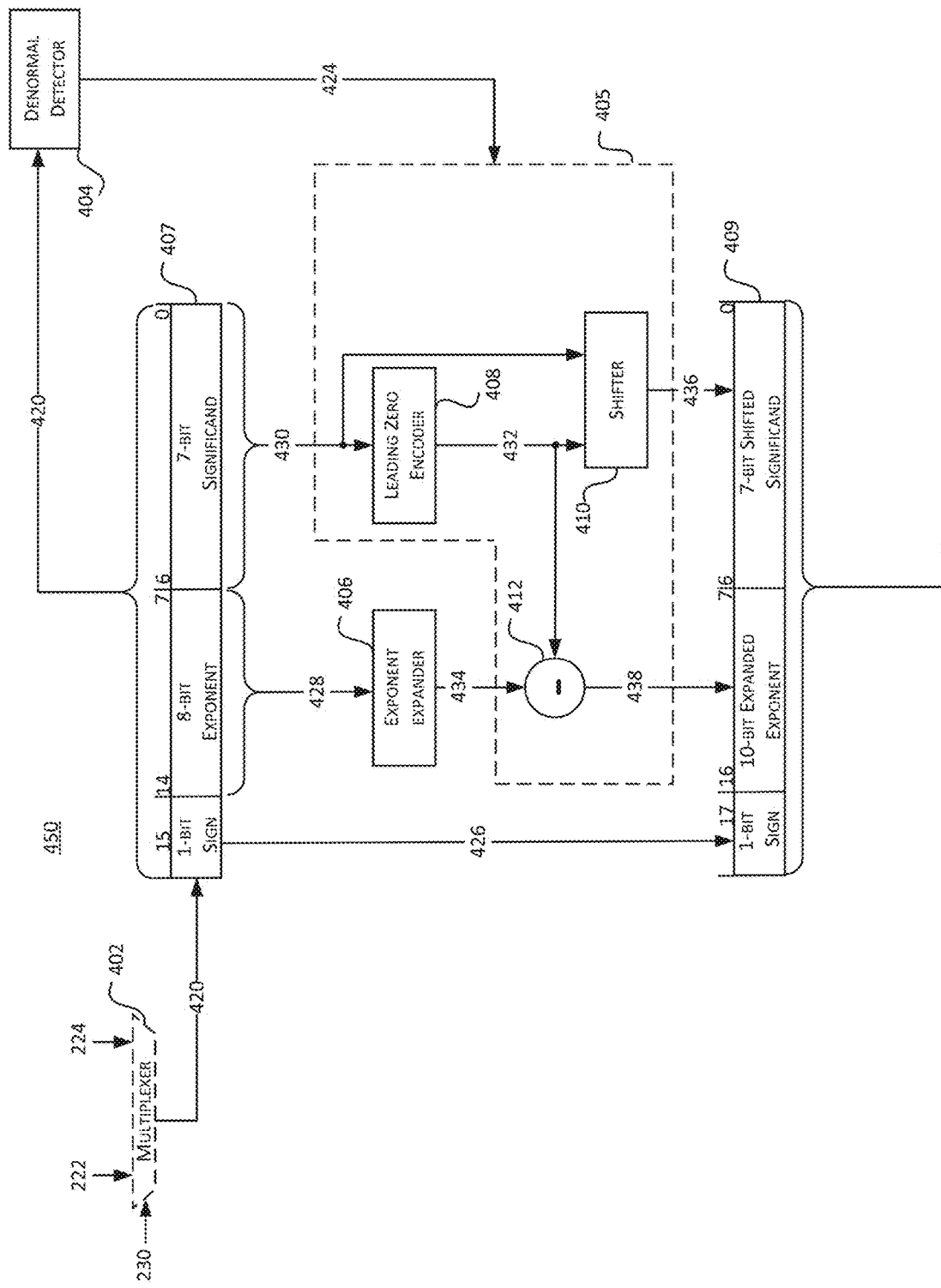
FIG. 4B illustrates a normalizer showing the selection of an input to be normalized where the input is a brain floating-point 16-bit number, according to some examples of the disclosed technologies.

FIG. 2A illustrates a PE 00 in a systolic array for neural network computations, according to certain embodiments of the disclosed technologies. The PE 00 may be part of a systolic array similar to the systolic array 100 in FIG. 1. FIG. 4A and FIG. 4B show additional details of the normalizers 225, 227 of FIG. 2A. Some embodiments may be described with reference to neural networks, however, it will be understood that certain embodiments may be used in other applications, e.g. pattern recognition, image processing, audio processing, video processing, etc., without deviating from the scope of the technologies.

The systolic array 200 includes normalizers 225, 227 and a plurality of processing elements including PE 00 and PE 01. The PE 00 may include a data element load generator 202, an input data element register 204, a weight register 206, a multiplier 208, an adder 210, a skip calculation generator 212, a skip calculation register 214, a selector circuit 216, an input partial sum register 218, a cached weight register 220, and an operation decoder 256. The PE 00 may be configured to receive a normalized input data element 222, a normalized weight 224, a zero data element indicator 226, a zero weight indicator 228, an opcode 230, a weight load 232, and an input partial sum 234 to perform the convolution computations according to some embodiments.

The PE 00 may be connected to a first normalizer 225 and a second normalizer 227. The first normalizer 225 may receive a first input (such as input data element 221), and the second normalizer 227 may receive a second input (such as weight 223). The first normalizer 225 may convert the first input into a first normalized input, and the second normalizer 227 may convert the second input into a second normalized input. The first normalizer 225 may be configured to provide the PE 00 with the normalized input data element 222, wherein the normalized input data element 222 is a normalized version of the input data element 221. Further, the second normalizer 227 may be configured to provide the PE 00 with the normalized weight 224, wherein the normalized weight 224 is a normalized version of the weight 223.

The first normalizer 225 and the second normalizer 227 may detect when one or both of the input data element 221 and the weight 223 are a denormal number. For example, the first normalizer 225 may be configured to detect when the input data element 221 is denormal and the second normalizer 227 may be configured to detect when the weight 223 is denormal. Upon detecting a denormal number, the corresponding normalizer may provide a normalized version of the denormal number based at least in part upon detecting a denormal number. Normalizing a denormal number can include shifting a significand, adjusting an exponent to reflect shifts in the significand, and extending the number of bits used to represent the adjusted exponent. In some instances, one or both of the input data element 221 and the weight 223 may be a normal number and a corresponding normalizer may be configured to provide the corresponding normal number to the PE 00 and skip normalizing the corresponding normal number. For example, the first normalizer 225 may detect that the input data element 221 is denormal, normalize the input data element 221, and provide the normalized input data element 222 to the PE 00. Further, the second normalizer 227 may detect that the weight 223 is normal and provide the normalized weight 224 to the PE 00, wherein the weight 223 is equal to the normalized weight 224 and the second normalizer 227 may not perform a normalizer operation on the weight 223.

In the event that one or both of the input data element 221 and the weight 223 are already in a normalized representation, the first normalizer 225 and the second normalizer 227 can still extend the number of bits used to represent the adjusted exponent. Accordingly, subsequent arithmetic circuits such as the multiplier 208 can be configured to perform computations on numbers of a single format, regardless of whether the inputs were originally in normal or denormal representation. For example, the first normalizer 225 may detect that the input data element 221 is normal, extend the bits used to represent the exponent field of the input data element 221, and provide the normalized input data element 222 to the PE 00.

The first normalizer 225 and the second normalizer 227 may be configured to convert one or more floating-point inputs into a normalized representation. The floating-point inputs may be 8-bits, 16-bits, 32-bits, or any number of bits.

The PE 00 may receive the normalized input data element 222 via a first input port. The normalized input data element 222 may correspond to an input data set, or any array of input data elements. The PE 00 may receive one normalized input data element at a time, in uniform time periods, from the input dataset. For example, a uniform time period may correspond to a clock cycle. The input data set may be similar to an input feature map comprising input feature map elements. As an example, the input data set may correspond to an input image, an audio clip, a video clip, a text portion, or any other data which may be provided for data processing to identify a certain pattern or an object. In some instances, the input data set may correspond to an intermediate output dataset, which has gone through an activation function, e.g., ReLu or Sigmoid, as discussed with reference to FIG. 1. Each normalized input data element 222 may a floating-point data type or any suitable data type. Each normalized input data element 222 may include 8-bits, 16-bits, or any suitable number of bits. The normalized input data element 222 may be stored in the input data element register 204 for a period of time.

The PE 00 may receive the normalized weight 224 via a second input port. In some implementations, the normalized weight 224 may belong to a set of weight values corresponding to a convolution filter. The normalized weight 224 may be pre-loaded in the PE 00 prior to receiving the normalized input data element 222. In some embodiments, the PE 00 may receive one normalized weight value at a time, in uniform time periods, from the set of normalized weight values, to pre-load each PE in a given row with a respective normalized weight value. The PE may pass the normalized weight value to the next PE in the respective row until each PE in the given row has been pre-loaded. Each PE may cache the respective normalized weight value to use for computations with the normalized input data elements. Each normalized weight 224 may be a floating-point data type or any suitable data type. Each normalized weight 224 may include 8-bits, 16-bits, or any suitable number of bits. The normalized weight 224 may be stored in a cached weight register 220 for a period of time.

The PE 00 may receive the input partial sum 236 for a current operation via a third input port. In various implementations, the input partial sum 236 can be a 16 bit, 18 bit, 32, bit, 33 bit, 34 bit number or have any number of bits.

The PE 00 may receive the zero data element indicator 226 for a current operation via a fourth port. The zero data element indicator 226 may include a single bit or multiple bits. The zero data element indicator 226 may be used to indicate whether the normalized input data element 222 is zero. The zero data element indicator 226 may also be used to indicate whether the input data element 221 is zero. For example, a value of "1" for the zero data element indicator 226 may indicate that the normalized input data element 222 associated with the zero data element indicator 226 is zero, and a value of "0" for the zero data element indicator 226 may indicate that the normalized input data element 222 associated with the zero data element indicator 226 is not zero. A "0" may correspond to a logical zero or a logical low, and a "1" may correspond to a logical one or a logical high. For example, in some implementations, the logical zero may be represented by a first range of voltage levels (e.g., 0-2 volts), and the logical one may be represented by a second range of voltage levels (e.g., 3-5 volts). It will be understood that other implementations to represent a "0" value and a "1" value are possible without deviating from the scope of the disclosed technologies. The zero data element indicator 226 may be generated by a circuit external to the PE 00, and passed to all the PEs in the same row sequentially, in the uniform time periods.

The PE 00 may be configured to receive the zero weight indicator 228 via a fifth port. The zero weight indicator 228 may include a single bit or multiple bits. The zero weight indicator 228 may be used to indicate whether the normalized weight 224 associated with the zero weight indicator 228 is zero. The zero weight indicator 228 may also be used to indicate whether the weight 223 associated with the zero weight indicator 228 is zero. For example, a value of "1" for the zero weight indicator 228 may indicate that the normalized weight 224 is zero, and a value of "0" for the zero weight indicator 228 may indicate that the normalized weight 224 is not zero. The zero weight indicator 228 may be generated by a circuit external to the PE 00, and passed to all the PEs in the same row sequentially along with the normalized weight 224.

The weight load 232 may be used to load the normalized weight 224 into the cached weight register 220 to provide a cached weight 246. The weight load 232 may be asserted to cache the normalized weight 224 for the PE 00 in the cached weight register 220 before the normalized input data element 222 is fed into the array. As the weights are shifted into the array to pre-load each PE with a respective weight value, the weight load 232 may be asserted for each PE at certain time periods in order to pre-load each PE with the appropriate weight value.

The operation decoder 256 may be configured to decode the opcode 230 to determine an operation to be executed by the PE 00 for different instructions represented by different opcode values. In some embodiments, a first opcode value may correspond to an instruction to shift the normalized weights from one PE to another in the systolic array. A second opcode value may correspond to an instruction to start the arithmetic computations by the PE. For example, once the normalized weights have been pre-loaded in the systolic arrays, the normalized input data elements may be read from the memory and the arithmetic computations may be performed as the normalized input data elements pass through the array. A third opcode value may correspond to an instruction to execute NOPs. The NOPS may be used to space two systolic array instructions, or when there are no normalized input data elements to be read from the memory. For example, the NOPs may be used to space the instructions to shift the normalized weights, and the instructions to start the arithmetic computations. For example, for a 4×4 array, it may take up to 15 cycles to shift the normalized weights into all the PEs in the array before starting the arithmetic computations so 15 NOP cycles may be needed. The operation decoder 256 may be configured to decode the opcode 230 to generate a NOP 258, and the start computations signal 260. The operation decoder 256 may be configured to provide the start computations signal 260 to the weight register 206 that is connected to the multiplier 208 and to the adder 210. The operation decoder 256 may also be configured to provide the start computations signal 260 to the multiplier 208. The opcode 230 may include any suitable number of bits, e.g., two, four, etc. In some implementations, the opcode decoder 256 can also decode the opcode to determine a data type to provide a data type control signal 235 to indicate to the multiplier which data types to operate on.

In some implementations, the normalized input data element 222, the normalized weight 224, the opcode 230, the zero data element indicator 226, and the zero weight indicator 228 may belong to the row input bus 102, as discussed with reference to FIG. 1. In some implementations, a splitter (not shown) may be used in the PE 00 to split the row input bus 102 into different internal buses to carry the normalized input data element 222, the normalized weight 224, the opcode 230, the zero data element indicator 226, and the zero weight indicator 228 within the PE 00. For example, the normalized input data element 222 and the normalized weight 224 may belong to a first row input bus and the opcode 230, the zero data element indicator 226, and the zero weight indicator 228 may belong to a second row input bus.

The data element load generator 202 may be configured to generate a data load signal 242 that may be used to allow the input data element register 204 to skip storing of the normalized input data element 222 in certain conditions. In some embodiments, the normalized input data element 222 may be loaded into the input data element register 204 when the data load signal 242 is asserted based on the zero data element indicator 226 and the NOP 258. The data load signal 242 may be asserted when the zero data element indicator 226 corresponding to the normalized input data element 222 is "0" and the opcode 230 does not indicate a NOP (e.g., the NOP 258 is "0"). The data load signal 242 may not be asserted when the zero data element indicator 226 corresponding to the normalized input data element 222 or the NOP 258 is "1." The data element load generator 202 may be implemented using an OR, NOR, NAND, or any suitable circuit.

The input data element register 204 may be configured to store the normalized input data element 222, or skip storing of the normalized input data element 222 to provide a stored input data element 244 based on the data load signal 242 for a current operation. In some implementations, the input data element register 204 may store a Din input if a load input is "1", and may hold the previous value if the load input is "0." For example, if the data load signal 242 is "1", the input data element register 204 may store a new value for the normalized input data element 222, and if the data load signal 242 is "0", the input data element register 204 may skip storing the new value for the normalized input data element 222. Thus, in some instances, the input data element register 204 may only store non-zero value of the normalized input data element 222. According to certain embodiments, skipping the storing of the new value by the input data element register 204 may result in not toggling the stored input data element 244 and holding the previous value of the stored input data element 244.

The weight register 206 may be configured to store the cached weight 246 to provide a stored weight value 248 based on the start computations signal 260. In some implementations, the weight register 206 may store a Din input if a load input is "1", and may hold the previous value if the load input is "0." For example, if the start computations signal 260 is asserted (e.g., the start computations signal 260 is "1"), the cached weight 246 may be loaded into the weight register 206, else the weight register 206 may hold the previous value. Thus, the normalized weight 224 previously loaded into the cached weight register 220 using the weight load 232 may be shifted into the weight register 206 at the start of the arithmetic computations. In some embodiments, the stored weight value 248, once loaded at the start of the arithmetic computations, remains unchanged as the input data element is fed into the PE 00, one element at a time, for computations corresponding to one or more waves through the systolic array.

The PE 00 may provide the stored input data element 244 to a PE 01 based on the data load signal 242 for a current operation. The PE 01 may receive the stored input data element 244 via a first port as a normalized input data element 222. In some implementations, the input data element register 204 may store a Din input if a load input is "1", and may hold the previous value if the load input is "0." The PE 00 may provide the stored weight value 248 to a PE 01 based on a start computations signal 260. The PE 01 may receive the stored weight value 248 via a second port as a normalized weight 224. In some implementations, the weight register 206 may store a Din input if a load input is "1", and may hold the previous value if the load input is "0".

The multiplier 208 may perform a multiplication operation between the stored input data element 244 and the stored weight value 248. The multiplier 208 may be configured to generate a product 250 based on the multiplication operation. In some implementations, the product 250 may be an integer product, a floating-point product, or any other product. In some implementations, the multiplier 208 may generate a product 250 of 8-bits, 16-bits, 18-bits, 32-bits, or any other number of bits. The multiplier 208 may be implemented using a multiplier circuit. The multiplier 208 may be configured to perform floating-point multiplication, integer multiplication, or multiplication involving any other data type. The multiplier 208 may be implemented using a 16-bit multiplier data path, an 18-bit multiplier data path, or a multiplier data path with any number of bits. The multiplier 208 may be configured to support at least n-bits operations, wherein n is greater than or equal to the number of bits in the input.

The multiplier 208 may contain multiple data paths, for example, as further discussed with respect to FIG. 5. With respect to FIG. 2A, the multiplier 208 may contain separate data paths for computing a sign bit, a significand, and an exponent. The multiplier 208 may adjust the functionality in the data paths based at least in part on a data type control signal 235. For example, if the data type control signal 235 indicates a computation using normalized BF16 numbers with an exponent expanded from eight bits to ten bits, the multiplier 208 may map a shorter 7 bit significand into a longer 10-bit significand representation and further utilize the normalized 10-bit exponent of a normalized BF16 number. As another example, if the data type control signal 235 indicates a computation using normalized FP16 numbers with an exponent expanded from five bits to seven bits, the multiplier 208 may map a shorter 7-bit exponent into a 10-bit exponent representation and further utilize the 10-bit significand of the FP16 number. As a result, both BF16 and FP16 numbers can be represented within the multiplier 208 with a common format (e.g., a 10-bit exponent and a 10-bit significand). The data type control signal 235 may be configured to provide an interpretation of the data type of at least one of the normalized input data element 222 and the normalized weight 224.

The multiplier 208 may provide the adder 210 with the product 250. The adder 210 may perform an addition operation on the product 250 and the stored input partial sum 236 to provide an addition result 238. The adder 210 may be implemented using an adder circuit. The adder 210 may be configured to perform floating-point addition, integer addition, or non-integer addition. The adder 210 may be configured to perform addition on inputs with 8-bits, 16-bits, 18-bits, 32-bits, 34-bits, or any number of bits. The adder 210 may be implemented using a 16-bit adder data path, an 18-bit adder data path, a 32-bit adder data path, a 34-bit adder data path, or an adder data path with any number of bits. The adder 210 may be configured to support at least m-bits operations, wherein m is equal to or larger than the value of the multiplier data path. The adder data path may be configured to be a superset of the multiplier data path.

The multiplier 208 and the adder 210 may provide a fused multiply-accumulate operation. The multiplier 208 and the adder 210 may be integrated together to perform a single step multiply add operation. The PE 00 may be configured such that no rounding is performed on the output of the multiplier 208. In some implementations, the PE 00 may perform rounding on the output of the multiplier 208. The multiplier 208 may be configured to provide an accurate product 250 to the adder 210.

The selector circuit 216 may receive the addition result 238, the input partial sum 236, and the stored skip calculation indicator 254. The selector circuit 216 may select either the addition result 238 or the input partial sum 236 to provide as an output partial sum 240 via a sixth port. In some embodiments, the selector circuit 216 may contain at least one multiplexer, the multiplexer may select the addition result 238 or the input partial sum 236 to be produced. The selector circuit 216 may be configured to select either the addition result 238 or the input partial sum 236, based on the stored skip calculation indicator 254, to provide as an output partial sum 240 via a sixth port. According to some embodiments, when a value of either the normalized input data element 222 or the normalized weight 224 for a current operation is zero, or the NOP 258 is asserted, the addition result 238 since the product 250 may hold a value for the previous operation. In such cases, the stored skip calculation indicator 254 may allow bypassing the addition result 238, and selecting the input partial sum 236 to provide as the output partial sum 240. For example, when the stored skip calculation indicator 254 provides a skip calculation signal of "1", the input partial sum 236 may be selected as the output partial sum 240 for a systolic cycle, and when the stored skip calculation indicator 254 provides a skip calculation signal of "0", either the addition result 238 may be selected as the output partial sum 240 for the systolic cycle.

Figure 2B:
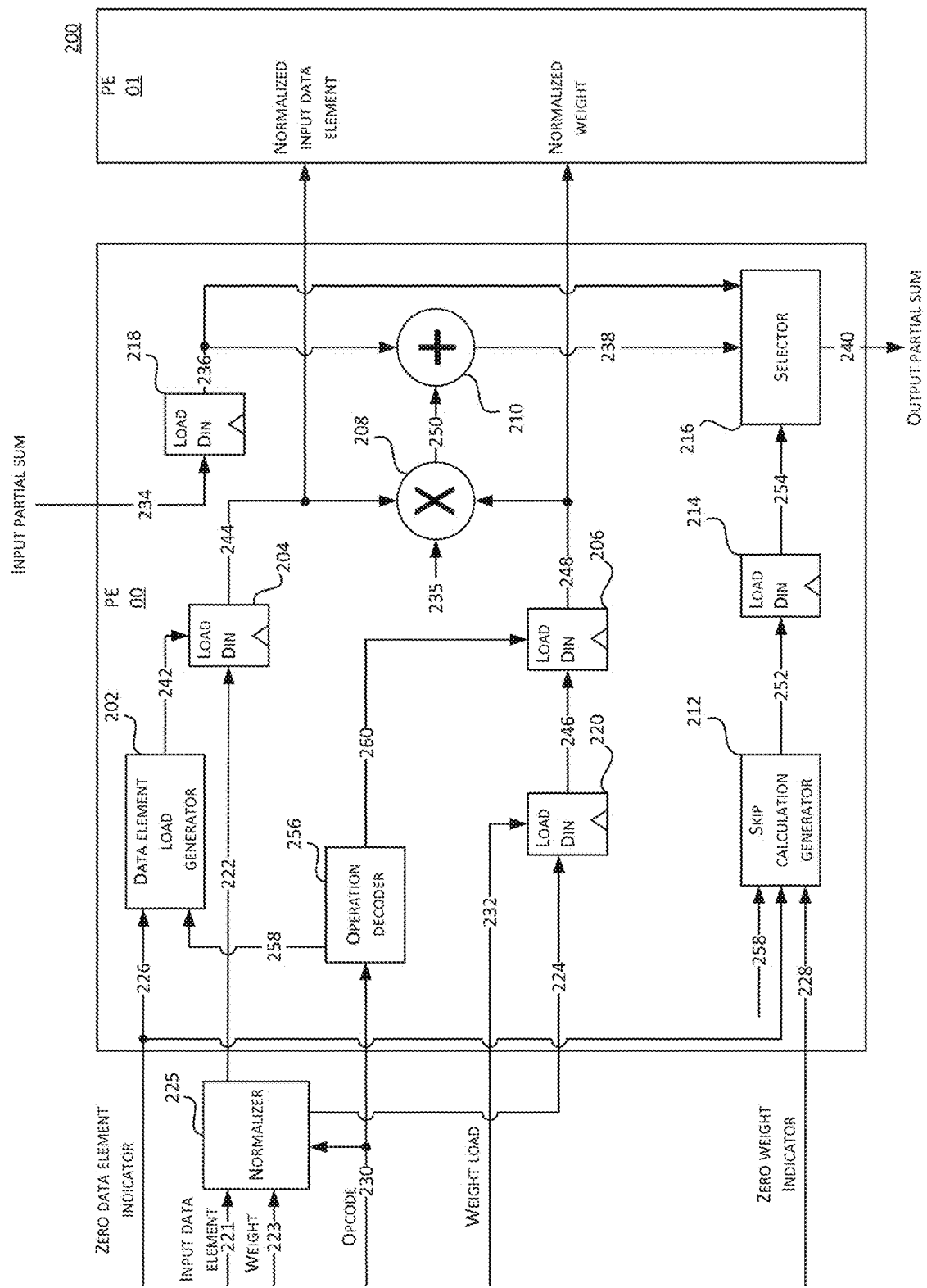
FIG. 2B illustrates a processing element for neural network computations with the inputs entering through the same normalizer, according to certain examples of the disclosed technologies.

FIG. 2B illustrates the figure shown in FIG. 2A with a shared normalizer 225 replacing the first normalizer 225 and the second normalizer 227. The shared normalizer 225 may be provided the input data element 221 and the weight 223. The shared normalizer 225 may also be provided the opcode 230. The shared normalizer 225 may perform a selection operation on the input data element 221 and the weight 223 based at least in part upon the opcode 230. In some implementations, the shared normalizer 225 will produce a normalized input based at least in part upon the opcode 230. For example, when the opcode 230 some set value, the shared normalizer 225 may be configured to perform a normalization operation on the weight 223 and provide the normalized weight 224 to the PE 00. Further, when the opcode 230 provides some other set value, the shared normalizer 225 may be configured to perform a normalization operation on the input data element 221 and provide the normalized input data element 222 to the PE 00.

In some implementations, the shared normalizer 225 may use a multiplexer to select between the input data element 221 and the weight 223. The normalized input data element 222 and the normalized weight 224 may be delivered to the PE 00 on separate buses. In some implementations, the normalized input data element 222 and the normalized weight 224 may be delivered on the same bus. In some implementations, the shared normalizer 225 may normalize both the input data element 221 and the weight 223 in the same clock cycle and provide the normalized input data element 222 and the normalized weight 224 to the PE 00. In some implementations, the shared normalizer 225 may normalize the weight 223 and provide the normalized weight 224 to the PE 00 during a clock cycle. The shared normalizer 225 may then normalize the input data element 221 and provide the normalized input data element 222 to the PE 00 during a second clock cycle.

Figure 3:
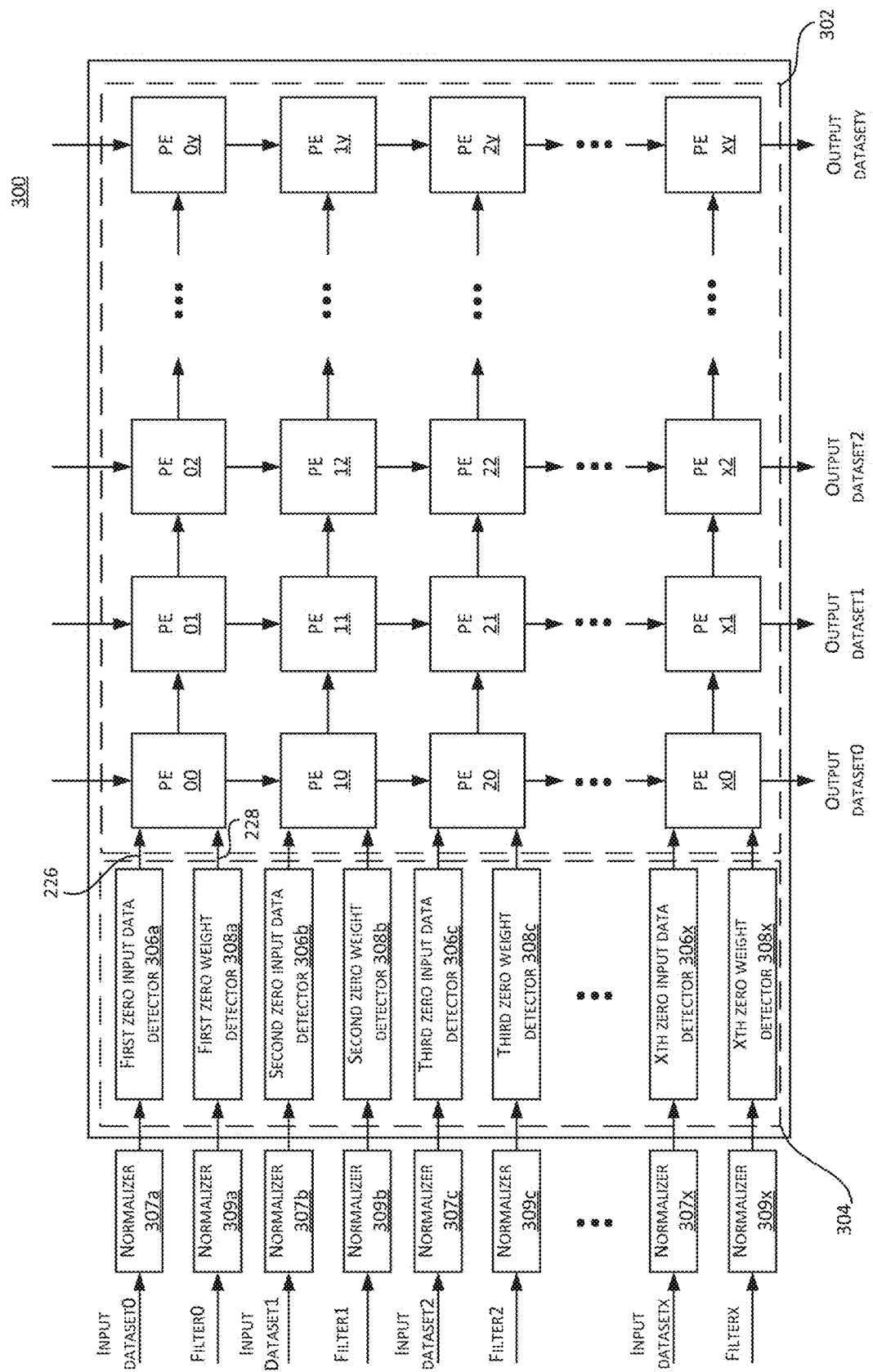
FIG. 3 illustrates an apparatus including zero detector circuits for normalized input data elements and normalized weights entering a systolic array for neural network computations, according to certain examples of the disclosed technologies.

FIG. 3 illustrates an apparatus 300 including zero detector circuits for normalized input data elements and normalized weights entering a systolic array for neural network computations, according to certain embodiments of the disclosed technologies.

The apparatus 300 may include a two-dimensional systolic array 302 comprising PEs arranged into rows and columns. The systolic array 302 may be similar to the systolic array 100 in FIG. 1. A first row of the systolic array 302 may include PE 00, PE 01, PE 02, . . . , PE 0y, a second row of the systolic array 302 may include PE 10, PE 11, PE 12, . . . , PE 1y, a third row of the systolic array 302 may include PE 20, PE 21, PE 22, . . . , PE 2y, and an Xth row of the systolic array 302 may include PE x0, PE x1, PE x2, . . . , PE xy. The x and y may include positive integers, e.g., 32, 64, 128, or any suitable number. Each PE of the systolic array 302 may be similar to the PE 01, and include means to perform arithmetic computations using power efficient methods, as discussed with reference to FIG. 2A, FIG. 2B.

In certain embodiments, a first (e.g., leftmost) PE in each row of the systolic array 302 may be coupled to a respective zero input data detector circuit to detect a zero value on an input data element, and a respective zero weight detector circuit to detect a zero value on a weight value entering the systolic array 302. For example, the PE 00 in the first row may be coupled to a first zero input data detector 306a and a first zero weight detector 308a, the PE 10 in the second row may be coupled to a second zero input data detector 306b and a second zero weight detector 308b, the PE 20 in the third row may be coupled to a third zero input data detector 306c and a third zero weight detector 308c, and the PE x0 in the Xth row may be coupled to an Xth zero input data detector 306x and an Xth zero weight detector 308x. The first zero input data detector 306a, the second zero input data detector 306b, the third zero input data detector 306c, . . . , and the Xth zero input data detector 306x may be configured to detect a zero value on a respective normalized input data element in an input dataset0, an input dataset1, an input dataset2, . . . , and an input datasetx respectively. Similarly, the first zero weight detector 308a, the second zero weight detector 308b, the third zero weight detector 308c, . . . , and the Xth zero weight detector 308x may be configured to detect a zero value on a respective normalized weight value in a filter0, a filter1, a filter2, . . . , and a filterx respectively.

Each zero input data detector and each zero weight detector in each row of the systolic array 302 may be coupled to a respective normalizer to receive a normalized input. Each zero input data detector may receive a normalized input data element and each zero weight detector may receive a normalized weight. For example, the first zero input data detector 306a may be coupled to a first normalizer 307a and the first zero weight detector 308a may be coupled to a second normalizer 309a, the second zero input data detector 306b may be coupled to a third normalizer 307b and the second zero weight detector 308b may be coupled to a fourth normalizer 309b, the third zero input data detector 306c may be coupled to a fifth normalizer 307c and the third zero weight detector 308c may be coupled to a sixth normalizer 309c, and the Xth zero input data detector 306x may be coupled to an Xth normalizer 307x and the Xth zero weight detector 308x may be coupled to an Yth normalizer 309x.

The normalizers 307a-307x and 309a-309x may be implemented as a separate entity external to the systolic array 302. For example, the normalizers 307a-307x and 309a-309x may be part of a circuit. In other embodiments, the circuit and the systolic array 302 may be part of a computing engine, which may be configured to perform arithmetic computations for the convolution operations. In some implementations, the normalizers 307a-307x and 309a-309x may be implemented as part of the systolic array 302.

In some implementations, the first normalizer 307a and the second normalizer 309a may be a first shared normalizer and the third normalizer 307b and the fourth normalizer 309b may be a second shared normalizer and the fifth normalizer 307c and the sixth normalizer 309c may be a third shared normalizer and the Xth normalizer 307x and the Yth normalizer 309x may be an Xth shared normalizer. Each shared normalizer may provide a normalized input data element and a normalized weight. In some implementations, each shared normalizer may contain one output bus and each shared normalizer must select a normalized input to produce. In some implementations, each shared normalizer may contain multiple output buses and each shared normalizer may output a normalized input data element and a normalized weight.

In some implementations, the zero input data detectors 306a-306x and/or zero weight detectors 308a-308x can be arranged before the respective normalizers 307a-307x, 309a-309x such that a zero input can be first detected, and if the zero input is detected, then the respective normalizer(s) 307a-307x, 309a-309x can be non-operational to conserve power. In some implementations, both the zero input data detectors 306a-306x and respective normalizers 307a-307x can receive the input datasets and operate in parallel instead of sequentially. In some implementations, both the zero weight detectors 308a-308x and the respective normalizers 309a-309x can receive the filters and operate in parallel instead of sequentially.

Each of the input dataset0, the input dataset1, the input dataset2, . . . , and the input datasetx may belong to an image, a text, a video clip, an audio clip, or another type of data set which may need to be processed by a neural network processor for convolution computations.

In some instances, the input dataset0, the input dataset1, the input dataset2, . . . , and the input datasetx may be associated with output dataset0, output dataset1, output dataset2, . . . , output datasety generated by an intermediate layer of the convolution operation. For example, the output dataset0, output dataset1, output dataset2, . . . , output datasety may go through activation functions and be fed back to the systolic array 302 as the input dataset0, the input dataset1, the input dataset2, . . . , and the input datasetx. The filter0, the filter1, the filter2, . . . , and the filterx may include different sets of weight values to convolve with the input dataset0, the input dataset1, the input dataset2, . . . , and the input datasetx. The weight values in the filter0, the filter1, the filter2, . . . , and the filterx may be pre-determined using supervised learning, non-supervised learning, or any suitable method of determining convolution filters.

Each zero input data detector for the respective row may be configured to detect whether a normalized input data element from the input dataset entering the respective row is "0" and generate a corresponding zero input data indicator for that normalized input data element. Each zero input data detector for the respective row may also be configured to detect whether an input data element from the input dataset entering the respective normalizer is "0" and generate a corresponding zero input data indicator for that input data element. The corresponding zero data element indicator may be passed into the first PE of the respective row along with the input data element. For example, the PE 00 may be the first PE of the first row in the systolic array 302. The PE 00 may be configured to receive normalized input data elements from the input dataset0 prior to other PEs in the first row (e.g., PE 01, PE 02, . . . , PE 0y). In some embodiments, one normalized input data element at a time may be fed sequentially, in uniform time periods, from the input dataset0 to the PE 00. The first zero input data detector 306a may be configured to generate the zero data element indicator 226 in each of the uniform time periods (e.g. clock cycles) for each input data element from the input dataset0. The zero data element indicator 226 corresponding to each normalized input data element may be fed to the PE 00 sequentially, in uniform time periods, along with each normalized input data element. The PE 00 may store or skip storing the normalized input data element 222 based on the value of the respective data load signal 242. In some implementations, the first zero input data detector 306a may include a comparator to compare the incoming normalized input data element with a zero to assert (e.g., set to "1") or de-assert (e.g., set to "0") the zero data element indicator 226 based on the value of the incoming normalized input data element. For example, the comparator may be implemented using an OR, XOR, NAND, or any suitable circuit.

Each zero weight detector for the respective row may be configured to detect whether a normalized weight value from a set of normalized weight values entering the respective row is zero and generate a corresponding zero weight indicator for that normalized weight value. Further, each zero weight detector may also be configured to detect whether a weight value from a set of filters entering the respective normalizers is zero and generate a corresponding zero weight indicator for that weight value. For example, the first zero weight detector 308a may be configured to detect whether a normalized weight value from the filter0 (e.g., the normalized weight 224) includes a zero value and generate the zero weight indicator 228 for the normalized weight. In some implementations, the first zero weight detector 308a may include a comparator to compare the normalized weight value with a zero to assert (e.g., set to "1") or de-assert (e.g., set to "0") the zero weight indicator 228. For example, the comparator may be implemented using an OR, XOR, NAND, or any suitable circuit. In one embodiment, one normalized weight value at a time may be fed sequentially, in uniform time periods, from the filter0 to the PE 00 for pre-loading the respective normalized weight values in the PE 00 to the PE 0y prior to starting the arithmetic computations. The first zero weight detector 308a may generate a corresponding zero weight indicator for each of those normalized weight values which may be fed to the PE 00 sequentially, in uniform time periods, along with the corresponding normalized weight value. The PE 00 may pass the respective normalized weight values and the corresponding zero weight indicators sequentially to the next neighboring PE until all the PEs in the first row have been preloaded with the respective normalized weight values and the corresponding zero weight indicators. The respective normalized weight value and the corresponding zero weight indicator may be cached in each PE before the respective normalized input data elements are fed to each row in the systolic array 302.

The second zero input data detector 306b, the third zero input data detector 306c, . . . , and the Xth zero input data detector 306x may be similar to the first zero input data detector 306a, and may generate a respective zero data element indicator, similar to the zero data element indicator 226, to provide to the PE 10, PE 20, . . . , and PE x0, sequentially, in the uniform time periods, for power optimization. The respective zero data element indicator generated for each row may be received by a respective first PE in each row via the respective row input bus 102, and propagated, sequentially, in the uniform time periods, by the first PE to all the PEs in the given row. The second zero weight detector 308b, the third zero weight detector 308c, . . . , and the Xth zero weight detector 308x may be similar to the first zero weight detector 308a, and may generate a respective zero weight indicator, similar to the zero weight indicator 228, to provide to the PE 10, PE 20, . . . , and PE x0, sequentially, to pre-load each PE in the respective row along with the respective weight value prior to starting the arithmetic computations.

In some embodiments, the zero input data detectors 306a-306x, and the zero weight detectors 308a-308x may be implemented as a separate entity external to the systolic array 302. For example, the zero input data detectors 306a-306x, and the zero weight detectors 308a-308x may be part of a circuit 304. In other embodiments, the circuit 304 and the systolic array 302 may be part of a computing engine, which may be configured to perform arithmetic computations for the convolution operations. Some embodiments of the disclosed technologies can provide reduced gate count and dynamic power consumption by detecting zeros on the input data elements and the weights entering a respective first PE in each row of the systolic array, and passing the zero indicators to all the PEs in the array as compared to using respective zero detectors within each PE in the systolic array 302.

Note that FIG. 3 only shows the respective zero data element indicator and the zero weight indicator entering the first PE in each row of the systolic array 302 for ease of illustration, however it will be understood that each PE in the respective row of the systolic array 302 may also receive the respective normalized input data element and the respective normalized weight value along with some control signals (e.g., opcode 230, weight load 232, data type, etc.), which may be propagated from the left to the right of the systolic array 302 for each row.

FIG. 4A shows an example FP16 normalizer 400 according to an example implementation. The normalizer 400 includes a multiplexer 402, a denormal detector 404, an exponent expander 406, and a denormal reformatter 405. The denormal reformatter 405 include a leading zero encoder 408, a shifter 410, and a subtractor 412. The normalizer 400 processes an original number 401 to result in a normalized number 403.

The normalizer 400 may be configured to receive one or more numbers to be normalized. The one or more numbers may include an input data element 221 and a weight 223, which may or may not be in a denormal representation. In some implementations, separate normalizers 400 may receive the input data element 221 or the weight 223 without a multiplexer. In some implementations, the one or more numbers may be normal numbers. If a normal number is detected, normalizer 400 may still perform the part of the normalization operation to increase the quantity of bits used to represent the exponent.

The multiplexer 402 may be configured to receive the one or more numbers received by the normalizer 400. The multiplexer 402 may also receive an opcode 230 or other indicator of whether a weight or input data element should be selected. The multiplexer 402 may be configured to decode the opcode 230 to select a number to be operated on by the normalizer 400. The multiplexer 402 may be configured to output a different number for the normalizer operation based on the value of the opcode 230. In some embodiments, a first opcode value may correspond to an instruction to output the weight 223 as the multiplexer output 420. A second opcode value may correspond to an instruction to output the input data element 221 as the multiplexer output 420. For example, once the input data element 221 and the weight 223 have been provided to the normalizer 400 and the multiplexer 402, the multiplexer 402 may be configured to output the input data element 221 and, at a later time, the weight 223, based at least in part on the opcode 230.

The original number 401 is an FP16 number with a sign bit portion, an exponent bit portion, and a significand bit portion. The FP16 format of the original number 401 includes a 1-bit sign, a 5-bit exponent, and a 10-bit significand. Other implementations can process other 16 bit floating-point numbers with other bit formats. Other implementations can process original numbers 401 that may contain 8-bits, 32-bits, or 64-bits. The original number 401 can be stored in registers.

The original number 401 may be provided to the denormal detector 404 for denormal detection. The denormal detector 404 may be configured to detect whether the multiplexer output 420 is denormal based at least in part on at least one of the value of the 1-bit sign, the value of the 5-bit exponent, or the value of the 10-bit significand. For example, the denormal detector 404 may be configured to detect a denormal number when the 5-bit exponent contains zeros in each bit and the significand is nonzero. The denormal detector 404 may provide an enable signal 424 to the denormal reformatter 405 based at least in part on the detection of a denormal number. For example, if the denormal detector 404 detects that the multiplexer output 420 is denormal, the denormal detector 404 may provide a first value to the denormal reformatter 405. If the denormal detector 404 detects that the multiplexer output 420 is normal, the denormal detector 404 may provide a second value to the denormal reformatter 405. In some implementations, the first number may be a 1 and the second number may be a 0. The detection of a denormal number may correspond to a logical high and the detection of a normal number may correspond to a logical zero.

The denormal reformatter 405 may receive the enable signal 424 output by the denormal detector 404. The denormal reformatter 405 may be operated or skipped based at least in part on the value of the enable signal 424. The denormal reformatter 405 may contain any or all of the leading zero encoder 408, the shifter 410, and the subtractor 412. The denormal reformatter 405 may be configured to enable any or all of the leading zero encoder 408, the shifter 410, and the subtractor 412. In some implementations, the denormal reformatter 405 may contain more components.

The exponent expander 406 may receive the 5-bit exponent 428 from the original number 401. The exponent expander 406 may increase a quantity of bits representing the exponent 428 from 5 bits to 7 bits. In some implementations, the exponent expander 406 might add 1, 2, 3, any number of bits to the exponent 428. The added quantity of bits can be sufficient to represent the denormal number in a normalized format. In the illustrated example, the exponent expander is configured to expand the 5-bit exponent by two bits.

The exponent expander 406 may be configured to expand the exponent 428 and retain the value of the exponent 428. The exponent expander 406 may be configured to expand the exponent using range translation by copying the most significant bit, inverting the most significand bit twice, and appending the other bits of the exponent 428 to the end of the expanded exponent 434. For example, if the exponent 428 has a value of 01111, the exponent expander 406 may copy the most significant bit "0", invert the most significant bit twice "11", and append the final four bits "1111" such that the expanded exponent 434 is 0111111. In some implementations, the two bits of data may correspond to logical zeros or logical lows that are added to the end of the exponent data field. For example, if the exponent 428 is 00000, the exponent expander 406 may expand the exponent 428 such that the expanded exponent 434 is 0000000. In various implementations, the exponent expander 406 might add the extra bits of data to any location of the exponent field depending on the endian format and signed or unsigned representation of the exponent.

The exponent expander 406 may provide the expanded version of the exponent to the subtractor 412 based at least in part on the enable signal 424 when a denormal format is detected by the denormal detector 404. Otherwise, the expanded version of the exponent can be stored as the 7-bit expanded exponent field of the normalized number 403.

The denormal reformatter 405 may contain the leading zero encoder 408. The leading zero encoder 408 may be enabled based at least in part on the enable signal 424 received from the denormal detector 404. The leading zero encoder 408 may receive the significand 430 as input. The leading zero encoder 408 may detect a number of leading zeros in the significand 430. The number of leading zeros in the significand 430 may correspond to the number of zeros before a one from left to right. In some implementations, the leading zero encoder 408 may be configured to detect a number of leading logical zeros. For example, if the significand is 0001000000, the leading zero encoder 408 may detect that the number of leading zeros is three. Further, if the significand is 0000001000, the leading zero encoder 408 may detect that the number of leading zeros is six. The leading zero encoder 408 may be configured to use any means of detecting the number of leading zeros in a numerical field. The leading zero encoder 408 may produce a leading zeros output 432 based at least in part upon the number of leading zeros detected by the leading zero encoder 408. In other implementations, the leading zero can be adjusted to account for other endian formats.

The denormal reformatter 405 may contain the shifter 410. The shifter 410 may be enabled based at least in part on the enable signal 424 received from the denormal detector 404. The shifter 410 may receive the leading zeros output 432 from the leading zero encoder 408 and receive the significand 430 from the original number 401. The shifter 410 may be configured to shift the significand 430 based at least in part upon the leading zeros output. The shifter 410 may further shift the significand 430 such that the first non-zero number is shifted out of the significand and represented with an implied bit. The shifter 410 may shift the significand 430 by adding bits containing logical lows or zeros to the right or end of the significand 430. The shifter 410 may produce a shifted significand 436, wherein the shifted significand 436 may be the same number of bits as the significand 430. For example, if the significand 430 is 0000110000, then the leading zero encoder 408 can count four zeros and further adjust the shift count to five, and the shifter 410 may shift the significand 430 a total of five times and produce a shifted significand 436 of 1000000000. The shifter 410 may then provide the shifted significand 436 to the normalized number 403.

The denormal reformatter 405 may contain the subtractor 412. The subtractor 412 may be enabled based at least in part on the enable signal 424 received from the denormal detector 404. The subtractor 412 may receive the expanded exponent 434 from the exponent expander 406 and the leading zeros output 432 from the leading zeros encoder 408. The subtractor 412 may subtract a value from the expanded exponent 434 based at least in part on the leading zeros output 432. The subtractor 412 may compensate the exponent value for the shift of the significand. For example, if the leading zeros output 432 is equal to 5 and the expanded exponent is equal to 0011111 or 31, the subtractor 412 may be configured to subtract 5 from 0011111 or 31, such that the adjusted exponent 438 is equal to 0011010 or 26. The subtractor 412 may provide the adjusted exponent to the normalized number 403 as an output.

The normalized number 403 may be a second bit-length wherein the second bit-length is any number of bits larger than the first bit-length. The second bit-length can be sufficiently larger to include the expanded exponent. The normalized number 403 may be an 18-bit floating-point number with a sign bit portion, an exponent bit portion, and a significand bit portion when the original number 401 may be a 16-bit floating-point number. The normalized number 403 may contain a 1-bit sign, a 7-bit exponent, and a 10-bit significand. The 1-bit sign may be equal to the sign 426. The 7-bit exponent may be equal to the adjusted exponent 438. The 10-bit significand may be equal to the shifted significand 436. In some implementations, the sign bit portion, the exponent bit portion, and the significand bit portion of the normalized number 403 may be of any value. The normalizer 400 may be configured to provide the normalized number 403 as a normalized output 421. The normalized output 421 may be a normalized input data element 222, a normalized weight 224, or any other normalized number.

FIG. 4B shows an example BF16 normalizer 450 according to an example implementation. The BF16 normalizer 450 includes components similar to the FP16 normalizer of FIG. 4A except that in FIG. 4B an original number 407 begins in a BF16 format and is normalized into a normalized number 409 of a different format in comparison to the normalized number 403.

The original number 407 may be a BF16 number with a sign bit portion, an exponent bit portion, and a significand bit portion. The BF16 format of the original number 407 includes a 1-bit sign, an 8-bit exponent, and a 7-bit significand. Other implementations can process other 16-bit floating-point numbers with other bit formats. Other implementations can process original numbers 407 that may contain 8-bits, 32-bits, or 64-bits. The original number 407 can be stored in registers.

The normalized number 409 may be an 18-bit brain floating-point number with a sign bit portion, an exponent bit portion, and a significand bit portion. The normalized number 409 may contain a 1-bit sign, a 10-bit expanded exponent, and a 7-bit shifted significand. In some implementations, the normalized number 409 may contain 8-bits, 32-bits, or 64-bits. In some implementations, the normalized number 409 may be an integer or a non-integer data type.

The exponent expander 406 may receive the 8-bit exponent 428 from the original number 407. The exponent expander 406 may increase a quantity of bits representing the exponent 428 from 8 bits to 10 bits. In some implementations, the exponent expander 406 might add 1, 2, 3, any number of bits to the exponent 428. The exponent expander 406 may provide the expanded version of the exponent to the subtractor 412 based at least in part on the enable signal 424 when a denormal format is detected by the denormal detector 404. Otherwise, the expanded version of the exponent can be stored as the 10-bit expanded exponent field of the normalized number 409.

The original number 407 may have an exponent bit length of y and a significand bit length of z. The original number 401 may have an exponent bit length of m and a significand bit length of n where m does not equal y and z does not equal n. For example, the original number 407 may have an exponent bit length of 8 and a significand bit length of 7 while the original number 401 may have an exponent bit length of 5 and a significand bit length of 10. The normalized number 409 may have an exponent bit length of c and a significand bit length of d. The normalized number 403 have an exponent bit length of r and a significand bit length of s where c does not equal r and d does not equal s.

FIG. 5 shows an example multiply accumulate datapath 500. The example datapath 500 may be implemented as the multiplier 208 and the adder 210 discussed with respect to FIG. 2A and FIG. 2B. As shown in FIG. 5, the multiplier 208 may be configured to receive a normalized input data element 222 and a normalized weight 224 and provide a multiplication product to the adder 210. The adder 210 may be configured to receive the multiplication product and the input partial sum 234 and provide an addition result 238. By converting inputs into normalized representation before presenting inputs to the multiplier 208, the multiplier 208 can omit support for denormal inputs and denormal products. Normalized inputs with expanded exponents may provide a larger numeric range for calculations and the multiplier 208 may not require support for numeric underflow calculations.

The normalized input data element 222 may be an 18-bit number. In some implementations, the normalized input data element 222 may be any number of bits. The normalized input data element 222 may be a floating-point number or a brain floating-point number. In some implementations, the normalized input data element 222 may be any data type. The normalized input data element 222 may consist of a sign bit field, an exponent field, and a significand field. The multiplier 208 can be configured to support normalized input data elements of different types. For example, the normalized input data element 222 may contain a 1-bit sign, a 10-bit exponent, and a 7-bit significand. Further, the normalized input data element 222 may contain a 1-bit sign, a 7-bit exponent, and a 10-bit significand. The multiplier 208 may support both of these types of 18-bit input data elements. In some implementations, the normalized input data element 222 may contain an x-bit sign, a y-bit exponent, and a z-bit significand. The normalized input data element 222 may be provided to the multiplier 208 via a first sign data path 511, a first exponent data path 521, and a first significand data path 531.

The normalized weight 224 may be an 18-bit number. In some implementations, the normalized weight 224 may be any number of bits. The normalized weight 224 may be a floating-point number or a brain floating-point number. In some implementations, the normalized weight 224 may be any data type. The normalized weight 224 may consist of a sign bit path, an exponent bit path, and a significand bit path. For example, the normalized weight 224 may contain a 1-bit sign, a 10-bit exponent, and a 7-bit significand. Further, the normalized weight 224 may contain a 1-bit sign, a 7-bit exponent, and a 10-bit significand. In some implementations, the normalized weight 224 may contain an x-bit sign, a y-bit exponent, and a z-bit significand. The normalized weight 224 may be provided to the multiplier 208 via a second sign data path 512, a second exponent data path 522, and a second significand data path 532.

The multiplier 208 may contain a sign data path, an exponent data path, and a significand data path. The multiplier 208 may receive the first sign data path 511, the first exponent data path 521, and the first significand data path 531 from the normalized input data element 222. The multiplier 208 may receive the second sign data path 512, the second exponent data path 522, and the second significand data path 532 from the normalized weight 224. The multiplier 208 may also receive a data type control signal 235. The multiplier 208 may perform multiplication operations on floating-point or brain floating-point numbers. In some implementations, the multiplier 208 may perform multiplication operations on floating-point numbers for a certain quantity of systolic cycles and then later perform multiplication operations on brain floating-point numbers.

The sign data path of the multiplier 208 may be provided the first sign data path 511 and the second sign data path 512. The sign data path may be configured to output a partial sign data path 513 based at least in part on the first sign data path 511 and the second sign data path 512. In some implementations, the sign data path can be implemented as an exclusive or (XOR) function. The sign data path may provide the partial sign data path 513 to the adder 210.

The exponent data path of the multiplier 208 may be provided the first exponent data path 521, the second exponent data path 522, and the data type control signal 235. The exponent data path of the multiplier 208 may contain a 7 to 10 mapper 524 and an adder 526. The 7 to 10 mapper 524 may receive the first exponent data path 521, the second exponent data path 522, and the data type control signal 235. The 7 to 10 mapper 524 may be configured to perform a mapping operation based at least in part upon the data type control signal 235. The data type control signal 235 may indicate a data type of the normalized input data element 222 or the normalized weight 224. The data type control signal 235 may be configured to indicate a data type of either the normalized input data element 222 and/or a data type of the normalized weight 224.

The 7 to 10 mapper 524 may be configured to map the first exponent data path 521 or the second exponent data path 522 from 7-bits to 10-bits. In some implementations, the 7 to 10 mapper 524 may be configured to map an exponent data path from n-bits to m-bits where n and m are any numbers where n is less than m. The 7 to 10 mapper 524 may map the value of the first exponent data path 521 and/or the second exponent data path 522 to a 10-bit range. The mapped value of each of the exponent data paths may correspond to the unmapped value of each of the exponent data paths. For example, the 7 to 10 mapper 524 may receive a first exponent data path 521 with the value 0000001 and the 7 to 10 mapper 524 may map the first exponent data path 521 to a 10-bit field with the value 0000000001. The 7 to 10 mapper 524 may then provide the adder 526 with the mapped or unmapped versions of the first exponent data path 521 and the second exponent data path 522 based at least in part upon the data type control signal 235.

The data type control signal 502 may cause the mapping functionality to be skipped if the exponent is already represented as 10 bits. For example, as discussed with respect to FIG. 4A and FIG. 4B, the FP16 exponent field is expanded into a 7-bit exponent and the BF16 exponent field is expanded into a 10 bit exponent. Accordingly, if the data type control signal 502 indicates that the data type is BF16, then the expanded 10-bit exponent is provided as the exponent field of the 18-bit input data element 222, and no further mapping by the 7 to 10 mapper occurs. Alternatively, if the data type control signal 502 indicates that the data type is FP16, then the expanded 7-bit exponent is provided as the exponent field of the 18-bit input data element 222, and the 7 to 10 mapper maps the 7 bit exponent into a 10 bit exponent. In other implementations, shorter exponent fields of any length can be mapped into a longer exponent field, where both the shorter exponent field and the longer exponent field are parts of different, supported normalized formats.

The adder 526 may receive the mapped or unmapped versions of the first exponent data path 521 and the second exponent data path 522 based at least in part upon the data type control signal 235. The adder 526 may be configured to perform addition on the two values received from the 7 to 10 mapper 524. The adder 526 can also receive shift/carry information (not shown) from the significand data path. The adder 526 may provide a partial exponent data path 523 based at least in part on the addition performed on the two values received from the 7 to 10 mapper 524 to the adder 210. The partial exponent data path 523 can be 10 bits or other range sufficient to accommodate the exponent sum without overflow.

The significand data path of the multiplier 208 may be provided the first significand data path 531, the second significand data path 532, and the data type control signal 235. The significand data path of the multiplier 208 may contain a 7 to 10 mapper 534, an implied bit resolver 536, a binary multiplier 540, and a format adjuster 542. The 7 to 10 mapper 534 may receive the first significand data path 531, the second significand data path 532, and the data type control signal 235. The 7 to 10 mapper 534 may be configured to perform a mapping operation based at least in part upon the data type control signal 235. The data type control signal 235 may indicate a data type of the normalized input data element 222 and/or the normalized weight 224. The 7 to 10 mapper 534 may map the first significand data path 531 or the second significand data path 532 from 7-bits to 10-bits. The 7 to 10 mapper 534 may be configured to map both the first significand data path 531 and the second significand data path 532 from 7-bits to 10-bits. In some implementations, the 7 to 10 mapper 534 may be configured to map a significand data path from j-bits to k-bits where j and k are any numbers where j is less than k. The 7 to 10 mapper 534 may map the value of the first significand data path 531 or the second significand data path 532 to a 10-bit range. The mapped value of each of the significand data paths may correspond to the unmapped value of each of the significand data paths. For example, the 7 to 10 mapper 534 may receive a first significand data path 531 with the value 0000001 and the 7 to 10 mapper 534 may map the first significand data path 531 to a 10-bit field with the value 0000000001. The 7 to 10 mapper 534 may then provide the implied bit resolver 536 with the mapped or unmapped versions of the first significand data path 531 and the second significand data path 532 based at least in part upon the data type control signal 235.

The data type control signal 502 may cause the mapping functionality to be skipped if the significand is already represented as 10 bits. For example, as discussed with respect to FIG. 4A and FIG. 4B, the shifted significand field of a FP16 number is 10 bits, and the shifted significand field of a BF16 number is 7 bits. Accordingly, if the data type control signal 502 indicates that the data type is BF16, then the shifted 7-bit significand is processed in the significand data path without further mapping by the 7 to 10 mapper. Alternatively, if the data type control signal 502 indicates that the data type is FP16, then the shifted 7-bit significand is provided as the significand field of the 18-bit input data element 222, and the 7 to 10 mapper maps the 7 bit significand into a 10 bit significand. In other implementations, shorter significand fields of any length can be mapped into a longer exponent field, where both the shorter significand field and the longer significand field are parts of different, supported normalized formats.

The implied bit resolver 536 may provide the output of the 7 to 10 mapper 534 with an implied bit. The implied bit resolver 536 may be configured to add a most significant bit to the output of the 7 to 10 mapper 534. The implied bit resolver 536 may provide the binary multiplier 540 with a first output corresponding to the first significand data path with an implied bit and a second output corresponding to the second significand data path with an implied bit.

The binary multiplier 540 may multiply the first output of the implied bit resolver 536 by the second output of the implied bit resolver 536 wherein the first and second outputs of the implied bit resolver 536 correspond to the first and second significand data paths 531 and 532. The binary multiplier 540 may be configured to generate a multiplier product based on the multiplication operation. In some implementations, the product may be an integer product, a floating-point product, or any other product. In some implementations, the binary multiplier 540 may generate a product of 8-bits, 16-bits, 32-bits, or any other number of bits. The binary multiplier 540 may be implemented using a multiplier circuit. The binary multiplier 540 may be configured to perform floating-point multiplication, integer multiplication, or multiplication involving any other data type. The binary multiplier 540 may be implemented using a 16-bit multiplier data path, an 18-bit multiplier data path, or a multiplier data path with any number of bits. The binary multiplier 540 may provide a multiplier product to the format adjuster 542.

The format adjuster 542 may adjust the format of the multiplier product produced by the binary multiplier 540. The format adjuster 542 may add or reduce the number of bits used to represent the multiplier product, for example, by increasing the bit size to 23 bits. The format adjuster 542 may provide a partial significand data path to the adder 210.

The adder 210 may contain a sign data path, an exponent data path, and a significand data path. The adder 210 may be configured to receive the partial sign data path 513, the partial exponent data path 523, and the partial significand data path 533 from the multiplier 208. The adder 210 may also receive an input partial sum 234. The adder 210 may perform an addition operation on the multiplier product comprised of the partial sign data path 513, the partial exponent data path 523, and the partial significand data path 533 and the input partial sum 234. The adder 210 may perform addition operations on both floating-point and brain floating-point numbers. In some implementations, the adder 210 may perform addition operations on floating-point numbers and the adder 210 is a 32-bit floating-point adder. In some implementations, the adder 210 may only perform multiplication operations on brain floating-point numbers and the adder 210 is a 34-bit floating-point adder.

The adder 210 may be configured to generate an addition result 238 based on the addition operation. The addition result 238 may consist of a sign data path 515, an exponent data path 525, and a significand data path 535. In some implementations, the addition result 238 may be an integer sum, a floating-point sum, or any other sum. In some implementations, the adder 210 may generate a sum of 8-bits, 16-bits, 32-bits, 34-bits, or any other number of bits. The adder 210 may be implemented using a binary adder circuit. The adder 210 may be configured to perform floating-point addition, integer addition, or addition involving any other data type.

Figure 6:
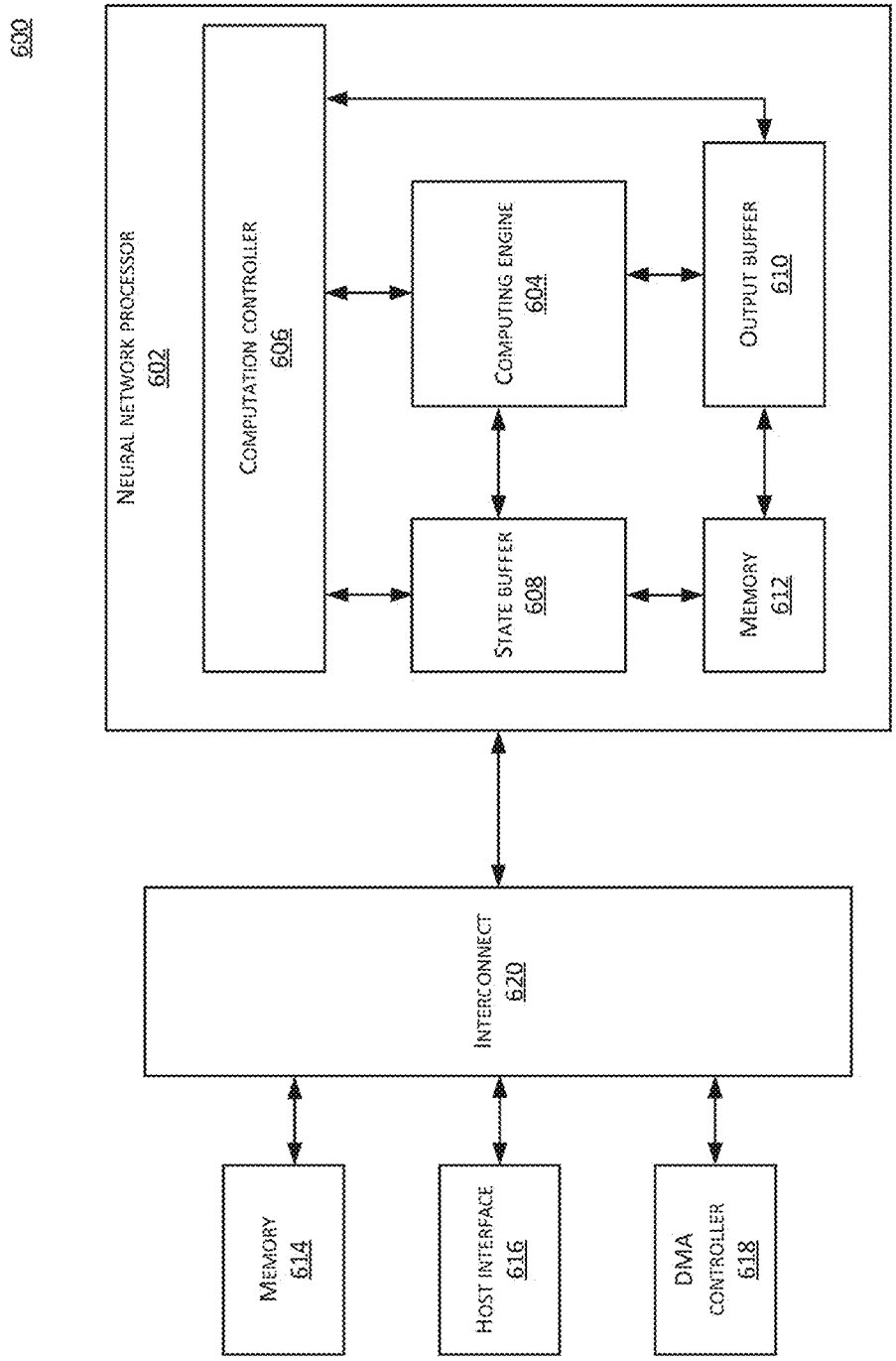
FIG. 6 shows an apparatus for neural network computations according to some examples of the disclosed technologies.

FIG. 6 shows an apparatus 600 for neural network computations according to some embodiments of the disclosed technologies. The apparatus 600 may be part of a computer system, e.g., a host server. For example, the host server may provide multi-tenant compute services for data processing applications such as an image recognition service, text-based data processing (e.g., processing of search queries), audio data processing, video data processing, etc. In some embodiments, a host device may operate a software application and communicate with the apparatus 600 to make a prediction based on computations with a prediction model utilizing a neural network processor. For example, the host device can make the prediction by identifying information included in an input data set for an image, text, audio, video, etc. using the prediction model.

The apparatus 600 may include a neural network processor 602 coupled to memory 614, a host interface 616, and a direct memory access (DMA) controller 618 via an interconnect 620. The neural network processor 602 may include a computing engine 604, a computation controller 606, a state buffer 608, an output buffer 610, and an activation engine 612. The neural network processor 602 can provide the computing resources to support the computations with the prediction model. The neural network processor 602 may be implemented as a system on chip (SoC), a field programmable gate array (FPGA), or any suitable circuit.

The memory 614 may be configured to store instructions, input data sets (e.g., pixel data of an image) and the weights (e.g., weights corresponding to certain visual and/or non-visual features) received from the host device. The memory 614 may also be configured to store outputs of the neural network processor 602 (e.g., one or more image recognition decisions on the input images in the form of output data sets). The memory 614 may include any suitable memory, e.g., dynamic random access memory (DRAM), synchronous DRAM (SDRAM), double data rate DRAM (DDR DRAM), storage class memory (SCM), flash memory, etc.

The host interface 616 may be configured to enable communication between the host device and the neural network processor 602. For example, the host interface 616 may be configured to transmit memory descriptors including the memory addresses of the stored data (e.g., input data sets, weights, results of computations, etc.) between the host device and the neural network processor 602. The host interface 616 may include, e.g., a peripheral component interconnect express (PCIe) interface, or any suitable interface for communicating with the host device. The host device may include a host processor and a host memory.

The DMA controller 618 may be configured to perform DMA operations to transfer data between the neural network processor 602 and the host device. For example, as discussed above, the host device can store the instructions, input data sets, and the weights in the memory 614. The host device can provide the memory addresses for the stored instructions, data, and the weights to the neural network processor 602 (e.g., in the form of memory descriptors). The neural network processor 602 can then obtain the stored instructions, data, and the weights based on the memory addresses provided by the host device. The neural network processor 602 can also store the results of computations (e.g., one or more image recognition decisions) in the memory 614, and provide the memory addresses for the stored results to the host device.

The state buffer 608 may be configured to provide caching of data used for computations at the computing engine 604. The data cached at the state buffer 608 may include, e.g., the input data sets and the weights acquired from the memory 614, as well as intermediate outputs of computations at the computing engine 604. The caching can reduce the effect of memory access bottleneck (e.g., caused by the latencies at the memory 614, the DMA controller 618, the interconnect 620, etc.) on the performance of the computing engine 604. The state buffer 608 can be an on-chip memory device and may include a static random access memory (SRAM) or any suitable memory.

The computation controller 606 may be configured to provide controls to various components of the neural network processor 602 to perform neural network computations. In some implementations, the computation controller 606 may read the instructions stored in the memory 614 and schedule the executions of the instructions by the computing engine 604. In the first embodiment, the computation controller 606 may perform scheduling of loading the weights into the computing engine 604 prior to reading the input data elements from the state buffer 608. For example, as discussed with reference to FIG. 2A, FIG. 2B, FIG. 4A, and FIG. 4B, the computation controller 606 may provide the opcode 230 and the weight load 232 to the computing engine 604 based on the instructions received from the host device. The computation controller 606 may provide appropriate values of the opcode 230 to the computing engine 604 which may be decoded by each PE in the computing engine to perform a corresponding operation. For example, the computing engine 604 may use the weight load 232 and the opcode 230 to pre-load the weights in all the PEs in the computing engine 604. Once the weights have been pre-loaded, the computation controller 606 may perform scheduling of loading the input data elements into the computing engine 604, sequentially, in uniform time periods, from the state buffer 608 to start the arithmetic computations.

In the second embodiment, the computation controller 606 may perform scheduling of loading the weights and the input data elements into the computing engine 604, sequentially, in uniform time periods, from the state buffer 608. The computation controller 606 may schedule loading of the weights and the input data elements in a respective first PE of each row in the systolic array 302 using a respective row data bus. For example, a respective input data element and a weight value may be loaded per cycle in the first PE of the respective row.

In another embodiment, the computation controller 606 may schedule loading of the weights in the systolic array 302 in parallel for each row using a respective column data bus for each PE in a given row. For example, weights for each row may be loaded in parallel per cycle. In some implementations, the computation controller 606 may determine a data type for the input data set based on the instructions received from the host device. The instructions may be in the form of an opcode. The data type may indicate a size and a type of the input data element, e.g., 4-bit, 8-bit, 16-bit, signed, unsigned, or floating-point.

The computing engine 604 may be configured to perform computations for the neural network. In some embodiments, the computing engine 604 may include a set of PEs configured to perform one or more arithmetic operations involved in the neural network computations. Each PE may perform multiply-accumulate operations using input data sets and associated weights. For example, the computing engine 604 may include the systolic array 302, and the circuit 304 comprising the zero input data detectors 306a-306x, and the zero weight detectors 308a-308x. In some embodiments, the zero input data detectors 306a-306x, and the zero weight detectors 308a-308x may be external to the computing engine 604. The computing engine 604 may execute instructions as scheduled by the computation controller 606 to load the weights and the input datasets sequentially from the state buffer 608 into the computing engine 604.

In the first embodiment, the weights may be pre-loaded prior to reading the input datasets from the state buffer 608, as discussed with reference to FIG. 4. The respective zero weight indicators corresponding to each weight may be cached locally in each PE and the cached values may be used to perform arithmetic computations with the respective input data element as the input data element is fed into the computing engine 604 along with the corresponding zero data element indicator. In the second embodiment, the weights and the input datasets may be read simultaneously from the state buffer 608, as discussed with reference to FIG. 5. The corresponding zero data element indicator and the zero weight indicator may be provided by the respective zero detector circuits and propagated sequentially from one PE to another for the respective row. The weights and the input datasets can be obtained from the state buffer 608 using one or more interfaces. In certain embodiments, the computing engine 604 may perform the arithmetic computations to reduce the dynamic power consumption of the systolic array 302 using the respective zero data element indicator and the zero weight indicator signals as discussed with reference to FIGS. 2-5, and provide the computations results to be stored in the output buffer 610.

The output buffer 610 may include a set of registers to store the output data sets generated by the computing engine 604. In some implementations, the output buffer 610 may also enable additional processing such as, e.g., a pooling operation to reduce the size of the stored outputs. In some implementations, the computing engine 604 can be operated to perform computations for a particular neural network layer, and the output buffer 610 can process the outputs of that neural network layer and store the processed output datasets (with or without processing by the activation engine 612) at the state buffer 608. The processed output datasets may be used by the computing engine 604 as the intermediate outputs. In some embodiments, the output buffer 610 may include adders to accumulate the partial sums generated for different sets of filters and input data sets to generate a convolution output array. The final output value of the convolution output array stored in the state buffer 608 can be retrieved by the computation controller 606 for storing at the state buffer 608.

The activation engine 612 may be configured to apply one or more activation functions (e.g., ReLu function) on the output of the output buffer 610. For example, the activation engine 612 may include one or more lookup tables (e.g., in the form of multiplexer circuits) that can map the input to one of the candidate outputs representing the result of applying the activation function to the input. In some examples, the activation engine 612 may also include a bypass path to allow outputs from the output buffer 610 to be stored directly at the state buffer 608 when activation functions are not to be applied.

Figure 7:
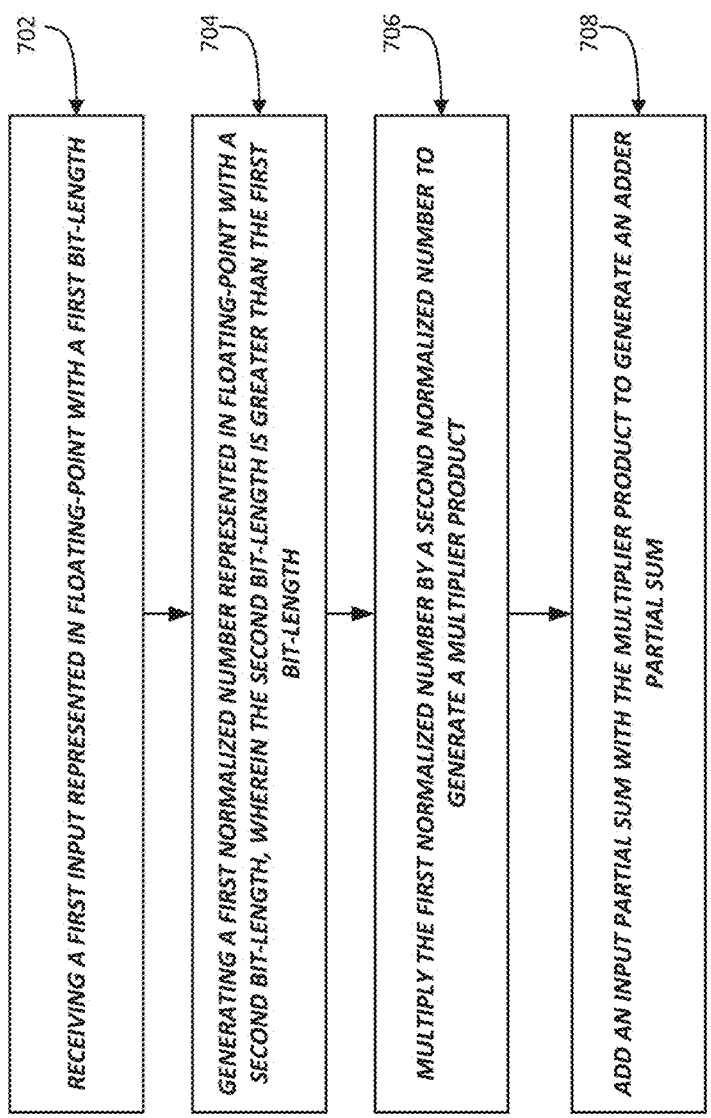
FIG. 7 shows a method executed by a normalizer and a processing element for neural network computations, according to some examples of the disclosed technologies.

FIG. 7 shows a method 700 executed by a PE for neural network computations, according to some embodiments of the disclosed technologies. The PE may be part of the systolic array 302, e.g., the PE 00. The systolic array 302 may be part of the computing engine 604 as seen in FIG. 6.

In a step 702, a first normalizer may receive a first input. For example, a first normalizer may receive a first input corresponding to an input data element or a weight. The first input may be represented in floating-point format with a first bit-length, wherein the first bit-length may be any number of bits. For example, the first input may be a floating-point number with 16-bits. The first input may contain 8-bits, 16-bits, 32-bits, or any number of bits. The first input may be a normal number or a denormal number.

In a step 704, the first normalizer may generate a first normalized number based at least in part on the first input. The first normalizer may detect whether the first input is normal or denormal. When the first input is a normal number, the first normalizer may generate the first normalized number, wherein the first normalized number is an expanded version of the first input. When the first input is a denormal number, the first normalizer may normalize the first input and generate the first normalized number, wherein normalizing the first input includes at least one of expanding the exponent, shifting the significand, and subtracting the value of a shift from the exponent. The first normalized number may be represented in floating-point format with a second bit-length, wherein the second bit-length may be any number of bits that is greater than or equal to the first bit-length. For example, the first input may be a floating-point number with 16-bits and the first normalized number may be a floating-point number with 18-bits. The first normalizer may contain a denormal detector, an exponent expander, a leading zero encoder, a shifter, a subtractor, and a multiplexer.

In a step 706, a PE 00 may receive the first normalized number and a second normalized number corresponding to a second input. In some implementations, the PE 00 may include a second normalizer to receive the second input and generate the second normalized number based at least in part on the second input. The second input may correspond to the input data element or the weight. The second input may correspond to the input data element when the first input corresponds to the weight and the second input may correspond to the weight when the first input corresponds to the input data element. The PE 00 may multiply the first normalized number by the second normalized number to produce a multiplier product. The PE 00 may contain multiple multiplier data paths and may choose a multiplier data path based at least in part on at least one of the data type of the first input or the data type of the second input. For example, when at least one of the first input and the second input are in 16-bit brain floating-point data type, the PE 00 may choose a first multiplier data path and when at least one of the first input and the second input are in 16-bit floating-point data type, the PE 00 may choose a second multiplier data path. The multiplier product may be represented in floating-point format or brain floating-point format with any number of bits.

In a step 708, the PE 00 may receive the multiplier product and an input partial sum. The PE 00 may add the multiplier product with the input partial sum to produce an addition result. The PE 00 may perform addition on floating-point and brain floating-point numbers. The addition result may be represented in floating-point format or brain floating-point format with any number of bits. The PE 00 may provide the addition result to a selector circuit, wherein the selector circuit is configured to select among the addition result and the input partial sum for the PE 00 to output as an output partial sum. The PE 00 may provide the output partial sum to a subsequent PE. For example, the PE 00 might generate an output partial sum and provide a PE 10 with the output partial sum, wherein the PE 01 receives the output partial sum as an input partial sum.

Figure 8:
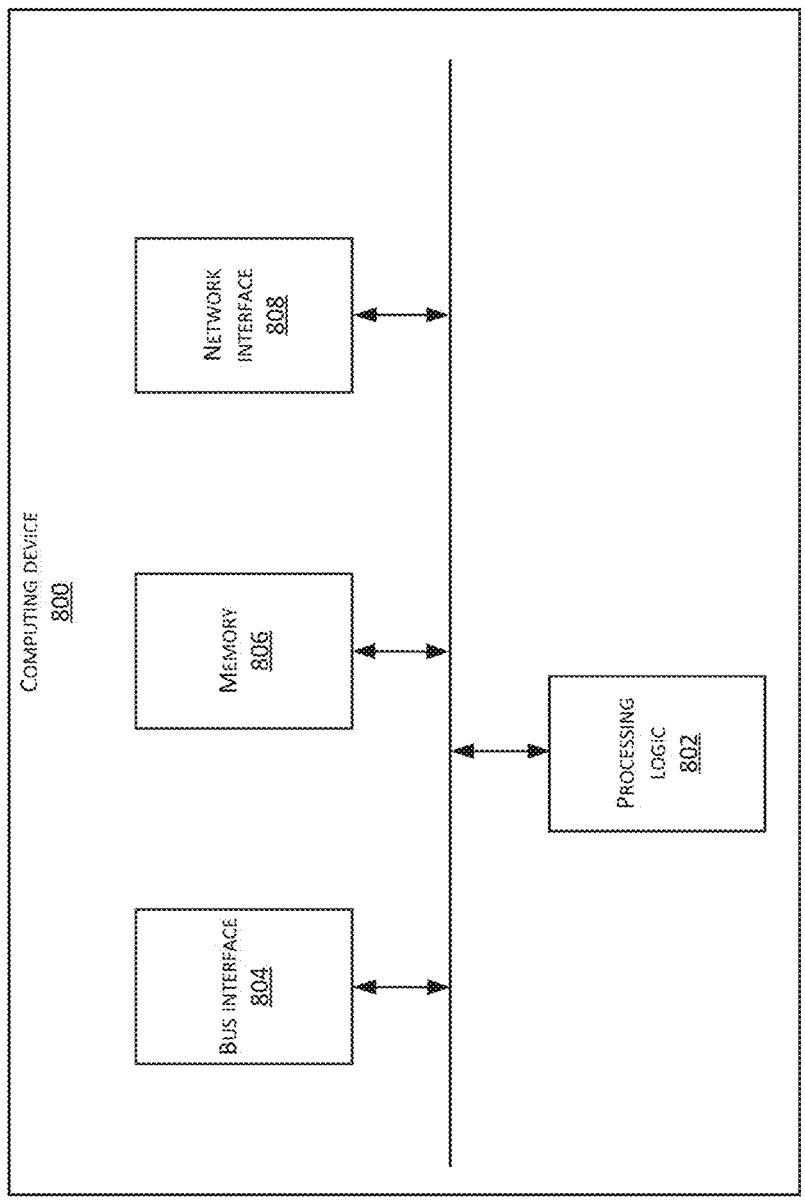
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 800 (e.g., the hardware and software resources associated with data processing) can be allocated to a client upon request.

In one example, the computing device 800 may include processing logic 802, a bus interface module 804, memory 806, and a network interface module 808. These modules may be hardware modules, software modules, or a combination of hardware and software. In certain instances, modules may be interchangeably used with components or engines, without deviating from the scope of the disclosure. The computing device 800 may include additional modules, which are not illustrated here for the ease of illustration. In some implementations, the computing device 800 may include fewer modules. In some implementations, one or more of the modules may be combined into one module. One or more of the modules may be in communication with each other over a communication channel 810. The communication channel 810 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), and network processing units (NPUs), processors configured to execute instructions or any other circuitry configured to perform logical arithmetic and floating-point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 806. The processing logic 802 may also include hardware circuities for performing artificial neural network computations including, for example, the neural network processor 602, etc.

The access to the processing logic 802 can be granted to a client to provide the personal assistant service requested by the client. For example, the computing device 800 may host a virtual machine, on which an image recognition software application can be executed. The image recognition software application, upon execution, may access the processing logic 802 to predict, for example, an object included in an image. As another example, access to the processing logic 802 can also be granted as part of bare-metal instance, in which an image recognition software application executing on a client device (e.g., a remote computer, a smart phone, etc.) can directly access the processing logic 802 to perform the recognition of an image.

The memory 806 may include either volatile or non-volatile, or both volatile and non-volatile types of memory. The memory 806 may, for example, include random access memory (RAM), read only memory (ROM), Electrically Erasable Programmable Read-Only Memory (EEPROM), flash memory, and/or some other suitable storage media. In some cases, some or all of the memory 806 may be internal to the computing device 800, while in other cases some or all of the memory may be external to the computing device 800. The memory 806 may store an operating system comprising executable instructions that, when executed by the processing logic 802, provides the execution environment for executing instructions providing functionality to perform convolution computations for the computing device 800. The memory 806 may also store, for example, software applications for performing artificial neural network computations. The memory may also store and maintain several data structures and tables for facilitating the functionality of the computing device 800.

The bus interface module 804 may enable communication with external entities, such as a host device and/or other components in a computing system, over an external communication medium. The bus interface module 804 may include a physical interface for connecting to a cable, socket, port, or other connection to the external communication medium. The bus interface module 804 may further include hardware and/or software to manage incoming and outgoing transactions. The bus interface module 804 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 804 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 808 may include hardware and/or software for communicating with a network. This network interface module 808 may, for example, include physical connectors or physical ports for wired connection to a network, and/or antennas for wireless communication to a network. The network interface module 808 may further include hardware and/or software configured to implement a network protocol stack. The network interface module 808 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc. In some embodiments, the computing device 800 may receive a set of parameters, such as the aforementioned weight values for convolution computations, from a server through network interface module 808.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A systolic circuit comprising:
a systolic array comprising processing elements; and
a first normalizer comprising a first denormal detector, the first normalizer configured to:
receive a first input represented in floating-point with a first bit-length;
detect by the first denormal detector, that the first input is denormal; and
generate a first normalized number represented in floating-point with a second bit-length, wherein the second bit-length is greater than the first bit-length;
wherein an individual processing element of the systolic array is configured to:
multiply the first normalized number by a second number to generate a multiplier product; and
add an input partial sum with the multiplier product to generate an addition result.

2. The systolic circuit of claim 1, wherein the processing elements are arranged into a plurality of rows.

3. The systolic circuit of claim 1, wherein to detect that the first input is denormal, the first normalizer is configured to detect that the first input is denormal based at least in part on a value of an exponent of the first input or a value of a significand of the first input.

4. The systolic circuit of claim 1, wherein the second number is:
a second normalized number; or
a second normal number.

5. The systolic circuit of claim 1, wherein the first normalizer is further configured to:
receive a second input represented in floating-point with a third bit-length;
detect by the first denormal detector, that the second input is denormal; and
generate a second normalized number, wherein the second normalized number is represented in floating-point with a fourth bit-length, wherein the fourth bit-length is greater than the third bit-length, wherein the second number is the second normalized number.

6. The systolic circuit of claim 1, wherein the systolic circuit further comprises a second normalizer, the second normalizer comprising a second denormal detector, the second normalizer configured to:
receive a second input represented in floating-point with a third bit-length;
detect by the second denormal detector, that the second input is denormal; and
generate a second normalized number, wherein the second normalized number is represented in floating-point with a fourth bit-length, wherein the fourth bit-length is greater than the third bit-length, wherein the second number is the second normalized number.

7. The systolic circuit of claim 1, wherein the first normalizer is further configured to:
receive a second input; and
detect by the first denormal detector, that the second input is normal, wherein the second input comprises the second number.

8. The systolic circuit of claim 1, wherein the systolic circuit further comprises a second normalizer, the second normalizer comprising a second denormal detector, the second normalizer configured to:
receive a second input; and
detect by the second denormal detector, that the second input is normal, wherein the second input comprises the second number.

9. The systolic circuit of claim 1, wherein individual processing elements of the systolic array further comprise:
a multiplier; and
an adder;
wherein the multiplier and adder lack support for inputs provided in denormal form.

10. The systolic circuit of claim 1, wherein the first normalizer is further configured to:
receive an input data element and a weight;
generate one or more of a normalized input data element or a normalized weight; and
select a normalized input data element or a normalized weight to be produced.

11. The systolic circuit of claim 1, wherein the first normalizer further comprises:
a first leading zero encoder or counter configured to detect a number of leading zeros in a significand of the first input;
a first exponent expander configured to expand a numerical range of an exponent of the first input; and
a first shifter configured to shift the significand of the first input based at least in part on the number of leading zeros in the significand of the first input.

12. The systolic circuit of claim 1, wherein:
the first normalizer is further configured to convert the first input into the first normalized number, wherein the first normalizer is configured to support at least n-bit floating-point numbers, wherein n can be any number; and
individual processing elements of the systolic array further comprise:
a multiplier configured to multiply at least two n-bit numbers; and
an adder configured to add two m-bit numbers, wherein m is greater than n.

13. A method for systolic processing by a processing element in a systolic array of processing elements, the method comprising:
receiving, by a normalizer of the processing element, a first input represented in floating-point with a first bit-length;
detecting, by a first denormal detector of the normalizer, that the first input is denormal;
generating a first normalized number represented in floating-point with a second bit-length;
multiplying, by the processing element, the first normalized number by a second number to generate a multiplier product; and
adding, by the processing element, an input partial sum with the multiplier product to generate an addition result.

14. The method of claim 13, wherein the second number is:
a second normalized number, or
a second normal number.

15. The method of claim 13, further comprising:
receiving, by the normalizer, a second input represented in floating-point with a third bit-length;
detecting, by the first denormal detector, that the second input is denormal; and
generating a second normalized number, wherein the second normalized number is represented in floating-point with a fourth bit-length, wherein the fourth bit-length is greater than the third bit-length, wherein the second number is the second normalized number.

16. The method of claim 13, further comprising:
receiving, by the normalizer, a second input; and
detecting, by the first denormal detector, that the second input is normal, wherein the second input comprises the second number.

17. Non-transitory computer-readable media including computer-executable instructions that, when executed by a systolic circuit comprising a normalizer and an array of processing elements, cause the systolic circuit to:
receive, by the normalizer, a first input represented in floating-point with a first bit-length;
detect, by a denormal detector of the normalizer, that the first input is denormal;
generate a first normalized number represented in floating-point with a second bit-length;
multiply the first normalized number by a second number to generate a multiplier product; and
add an input partial sum with the multiplier product to generate an addition result.

18. The non-transitory computer-readable media of claim 17, wherein the second number is:
a normalized number, or
a normal number.

19. The non-transitory computer-readable media of claim 17, wherein execution of the computer-executable instructions by the systolic circuit further causes the systolic circuit to:
detect that a second input is denormal, wherein the second input is represented in floating point with a third bit-length; and
generate the second number based on the second input, wherein the second number is represented in floating-point with a fourth bit-length, wherein the fourth bit-length is greater than the third bit-length.

20. The non-transitory computer-readable media of claim 17, wherein execution of the computer-executable instructions by the systolic circuit further causes the systolic circuit to detect that the second number is normal.

* * * * *